(12) United States Patent
Creighton et al.

(10) Patent No.: US 8,134,828 B2
(45) Date of Patent: Mar. 13, 2012

(54) CONFIGURABLE DEADFRONT FUSIBLE PANELBOARD

(75) Inventors: Lalita R. Creighton, Hillsboro, MO (US); Matthew R. Darr, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 159 days.

(21) Appl. No.: 12/691,344

(22) Filed: Jan. 21, 2010

(65) Prior Publication Data

US 2011/0176258 A1     Jul. 21, 2011

(51) Int. Cl.
*H02B 1/044* (2006.01)
(52) U.S. Cl. ........ 361/644; 361/641; 361/642; 361/643; 361/646; 361/647
(58) Field of Classification Search .............. 361/622, 361/624, 626–628, 630–631, 634, 636, 641–644, 361/646–648, 652, 655–656
See application file for complete search history.

(56) References Cited

U.S. PATENT DOCUMENTS

| | | | |
|---|---|---|---|
| 1,629,645 A * | 5/1927 | Starrett ........................ 361/627 |
| 1,807,228 A | 5/1931 | Starr | |
| 1,852,190 A | 4/1932 | Roe | |
| 1,966,716 A | 7/1934 | Green | |
| 1,974,154 A | 9/1934 | Frank et al. | |
| 2,416,169 A | 2/1947 | Freese | |
| 3,032,629 A | 5/1962 | Uecker | |
| 3,077,525 A | 2/1963 | Dyer | |
| 3,192,446 A * | 6/1965 | Meacham ..................... 361/634 |
| 3,218,519 A * | 11/1965 | Casey ........................... 361/656 |
| 3,379,842 A | 4/1968 | Downs et al. | |
| 3,471,817 A | 10/1969 | Marechal | |
| 3,599,135 A | 8/1971 | Gryctko | |
| 3,614,697 A | 10/1971 | Dunham et al. | |
| 3,732,516 A | 5/1973 | Puetz | |
| 3,743,892 A * | 7/1973 | Fritz et al. ..................... 361/652 |
| 3,816,820 A | 6/1974 | Stanaitis | |
| 3,918,790 A | 11/1975 | Filson | |
| 3,936,787 A | 2/1976 | Ranzanigo | |
| 3,958,197 A | 5/1976 | Gryctko | |
| 3,958,204 A | 5/1976 | Gryctko | |
| 3,967,873 A | 7/1976 | Schumacher | |
| 4,128,024 A | 12/1978 | Hyams et al. | |
| 4,263,589 A | 4/1981 | Lewiner et al. | |
| 4,385,281 A | 5/1983 | McAlear et al. | |

(Continued)

FOREIGN PATENT DOCUMENTS

DE   10148863 A1   4/2003

(Continued)

OTHER PUBLICATIONS

"The New Standard in Fusible Panelboards", Copper Bussmann, Reorder #3144, 2008, 2 pages.*

(Continued)

*Primary Examiner* — Robert J Hoffberg
(74) *Attorney, Agent, or Firm* — Armstrong Teasdale LLP

(57) ABSTRACT

Panelboard assemblies that are configurable by the end user to accommodate user selected fusible switching disconnect devices of different ratings and sizes. Deadfront interfaces are made possible with terminal covers independently operable from a panel door and a reconfigurable branch circuit enclosure cover. An integral load side disconnect switch facilitates selective coordination of feeder circuit loads, and increased interrupting ratings per volume are made possible.

29 Claims, 18 Drawing Sheets

U.S. PATENT DOCUMENTS

| | | | |
|---|---|---|---|
| 4,390,225 A | | 6/1983 | Coyne et al. |
| 4,429,231 A | | 1/1984 | De Loach, Jr. et al. |
| 4,472,761 A | * | 9/1984 | Koslosky et al. ............. 361/638 |
| 4,488,767 A | | 12/1984 | Lehman et al. |
| 4,496,916 A | | 1/1985 | Carpenter et al. |
| 4,511,875 A | | 4/1985 | Arikawa |
| 4,556,874 A | | 12/1985 | Becker |
| 4,568,899 A | | 2/1986 | May et al. |
| 4,604,613 A | | 8/1986 | Clark |
| H000248 H | | 4/1987 | Middlebrooks |
| 4,691,197 A | | 9/1987 | Damiano et al. |
| 4,724,512 A | * | 2/1988 | Bischof et al. ............. 361/642 |
| 4,755,785 A | | 7/1988 | Bernstein |
| 4,884,050 A | | 11/1989 | Kozel |
| 4,952,915 A | | 8/1990 | Jenkins et al. |
| 4,966,561 A | | 10/1990 | Norden |
| 5,120,245 A | | 6/1992 | Robertson et al. |
| 5,233,330 A | | 8/1993 | Hase |
| 5,272,592 A | | 12/1993 | Harris et al. |
| 5,343,192 A | | 8/1994 | Yenisey |
| 5,347,418 A | | 9/1994 | Ando et al. |
| 5,355,274 A | | 10/1994 | Marach et al. |
| 5,378,931 A | | 1/1995 | Bolda et al. |
| 5,406,438 A | | 4/1995 | Ranjan et al. |
| 5,473,495 A | | 12/1995 | Bauer |
| D367,041 S | | 2/1996 | Alfaro et al. |
| 5,559,662 A | | 9/1996 | Happ et al. |
| 5,561,580 A | | 10/1996 | Pounds et al. |
| 5,594,404 A | | 1/1997 | Happ et al. |
| 5,726,852 A | | 3/1998 | Trifiletti et al. |
| 5,874,884 A | | 2/1999 | Hull et al. |
| 5,886,868 A | | 3/1999 | White et al. |
| 5,963,411 A | | 10/1999 | Mollet et al. |
| 5,969,587 A | | 10/1999 | Combas |
| 5,973,418 A | | 10/1999 | Ciesielka et al. |
| 6,034,586 A | | 3/2000 | Runyan et al. |
| 6,160,699 A | | 12/2000 | Gibson et al. |
| 6,373,370 B1 | | 4/2002 | Darr et al. |
| 6,420,948 B1 | | 7/2002 | Runyan |
| 6,472,878 B1 | | 10/2002 | Bruchmann |
| 6,531,948 B1 | | 3/2003 | Mennell |
| 6,566,996 B1 | | 5/2003 | Douglass et al. |
| 6,587,028 B2 | | 7/2003 | Mollet et al. |
| 6,696,969 B2 | | 2/2004 | Torrez et al. |
| 6,717,505 B1 | | 4/2004 | Bruchmann |
| 6,723,968 B2 | | 4/2004 | Danko et al. |
| 6,727,797 B1 | | 4/2004 | Bruchmann |
| 6,859,131 B2 | | 2/2005 | Stanek et al. |
| 6,864,443 B1 | | 3/2005 | Bruchmann |
| 6,865,443 B2 | | 3/2005 | Snapp et al. |
| 6,897,760 B2 | | 5/2005 | Kawata et al. |
| 6,956,459 B2 | | 10/2005 | Lau et al. |
| 6,998,954 B2 | | 2/2006 | Milanczak |
| 7,115,829 B2 | | 10/2006 | Schmid |
| 7,351,628 B2 | | 4/2008 | Forbes et al. |
| 7,369,029 B2 | | 5/2008 | Ackermann |
| 7,474,194 B2 | | 1/2009 | Darr et al. |
| 7,495,540 B2 | | 2/2009 | Darr et al. |
| 7,561,017 B2 | | 7/2009 | Darr et al. |
| 7,576,630 B2 | | 8/2009 | Darr |
| 7,639,112 B2 | | 12/2009 | Nicoletti, III |
| 7,885,873 B2 | * | 2/2011 | Burakoff et al. ............. 705/35 |
| 2008/0042794 A1 | | 2/2008 | Darr |
| 2008/0158788 A1 | | 7/2008 | Darr et al. |
| 2009/0128280 A1 | | 5/2009 | Darr et al. |
| 2009/0295533 A1 | | 12/2009 | Darr et al. |
| 2010/0014273 A1 | | 1/2010 | Darr |

FOREIGN PATENT DOCUMENTS

| | | |
|---|---|---|
| EP | 1232510 B1 | 8/2002 |
| FR | 2331881 | 10/1977 |
| FR | 2417839 | 9/1979 |
| FR | 2807576 A1 | 10/2001 |
| GB | 749872 | 6/1956 |
| GB | 2135129 | 8/1984 |
| GB | 2370432 A | 6/2002 |
| WO | 9613847 | 5/1996 |
| WO | 9918589 | 4/1999 |
| WO | 0139233 A1 | 5/2001 |
| WO | 2005104161 A1 | 11/2005 |
| WO | 2008101111 A2 | 8/2008 |
| WO | 2008101111 A3 | 8/2008 |
| WO | 2009064769 A1 | 5/2009 |

OTHER PUBLICATIONS

"Quik-Spec™ Coordination Panelboard—Data Sheet", Copper Bussmann, Data Sheet 1160, 2011, 15 pages.*

CUBEFuse(R) Compact Circiut Protector Base (CCPB) for Quik-Spec(TM) Coordination Panelboards, Cooper Bussman, Data Sheet 1161, dated 2008.*

International Search Report and Written Opinion of PCT/US2008/083212; Feb. 20, 2009; 13 pages.

International Search Report and Written Opinion of PCT/US2008/079130; Dec. 22, 2008; 12 pages.

International Search Report and Written Opinion of PCT/US08/54005; Jul. 16, 2008; 10 pages.

International Search Report of PCT/US2006/042482; Feb. 19, 2007; 4 pages.

Search Report of application No. GB1021463.3; Apr. 13, 2011; 3 pages.

* cited by examiner

CONFIGURABLE DEADFRONT FUSIBLE PANELBOARD

CROSS REFERENCE TO RELATED APPLICATIONS

This application relates to subject matter disclosed in commonly owned U.S. patent application Ser. No. 11/941,212 filed Nov. 16, 2007, now issued U.S. Pat. No. 7,855,873, the disclosure of which is hereby incorporated by reference in its entirety.

BACKGROUND OF THE INVENTION

The field of the invention relates generally to electrical control panels, and more specifically to fusible panelboards for electrical power systems.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and open one or more circuits through the fuse to prevent electrical component damage.

For power distribution purposes, fuses are sometimes arranged in and enclosed by a panelboard, sometimes referred to as a control panel. Other circuit protection components such as circuit breakers are also commonly used in combination with fuses in panelboards. A main service device connects a power supply to and from the panelboard, and the circuit breakers and fuses typically provide circuit protection to branch circuits being fed from the panel through the main disconnect. When the main service device is a disconnect switch it can be used to de-energize all the branch circuits, or the individual branch circuits can be de-energized using the circuit breakers while the main disconnect remains connected and the other branch circuits are still supplied with electrical power. Additionally, when electrical fault conditions occur, the circuit protectors (e.g., the breakers and the fuses) may be selectively coordinated so that only the affected branch circuit or feeder circuit may be interrupted while the other branch circuits and feeder circuits continue normal, full power operation.

For certain applications, circuit breakers tend to provide practical limitations on the current interruption ratings of such panelboards as well as practical limitations on the size of the panelboards. It would be desirable to provide smaller panelboards with higher interrupting ratings.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Fusible switching disconnect devices have been recently developed that emulate the switching capability of circuit breakers, but do not involve circuit breakers. Thus, when such fusible switching disconnect devices are utilized in panelboards, the current interruption ratings of the board may be increased, as well as reducing the size of the panelboard. The disconnect devices also accommodate the fuses without involving a separately provided fuse holder, and also establishing electrical connection without fastening of the fuse to the line and load side terminals.

Figure 19:
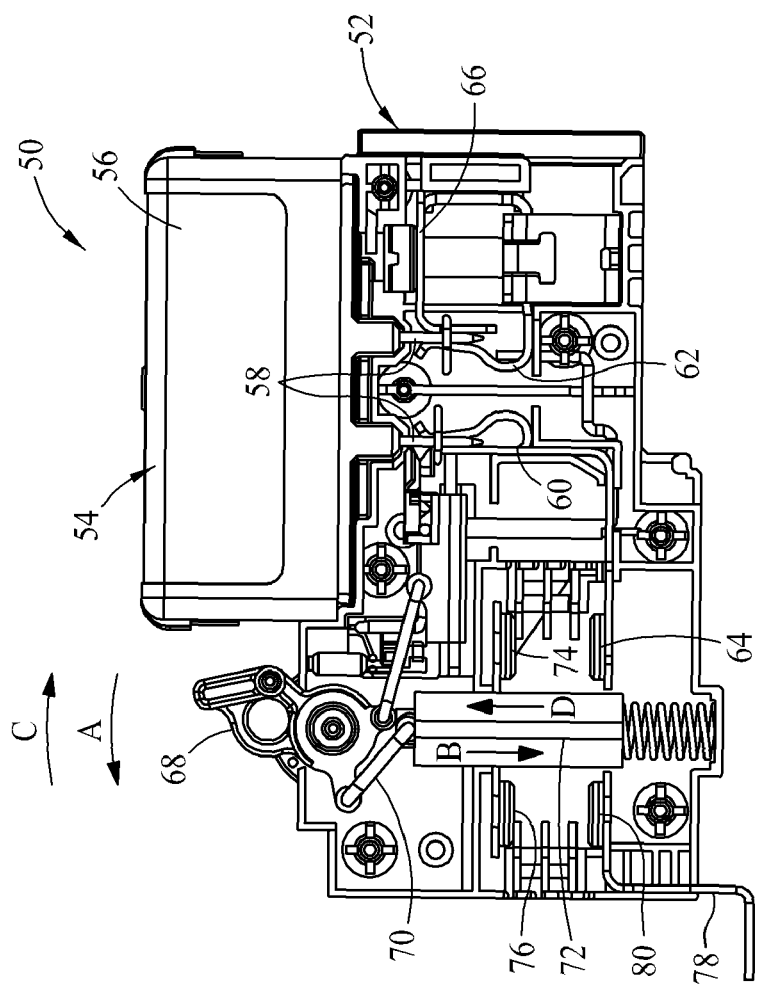
FIG. 19 illustrates internal components of an exemplary fusible switching disconnect device for a fusible panel board assembly.

Referring first to FIG. 19, an exemplary fusible switching disconnect device 50 is illustrated that may be advantageously used in fusible panelboard assembly (described below) to increase the interrupting ratings thereof while reducing the physical size of the panelboard itself.

As shown in FIG. 19, the device 50 is provided as a module that includes a non-conductive switch housing 52 configured or adapted to receive a rectangular fuse module 54. The fuse module 54 is a known assembly including a rectangular housing 56, and terminal blades 58 extending from the housing 56. A primary fuse element or fuse assembly is located within the housing 56 and is electrically connected between the terminal blades 58. Such fuse modules 54 are known and in one embodiment are CUBEFuse™ power fuse modules commercially available from Cooper/Bussmann of St. Louis, Mo.

A line side fuse clip 60 may be situated within the switch housing 52 and may receive one of the terminal blades 58 of the fuse module 54. A load side fuse clip 62 may also be situated within the switch housing 52 and may receive the other of the fuse terminal blades 58. The line side fuse clip 60 may be electrically connected to a line side terminal including a stationary switch contact 64. The load side fuse clip 62 may be electrically connected to a load side terminal 66.

A rotary switch actuator 68 is further provided on the switch housing 52, and is mechanically coupled to an actuator link 70 that, in turn is coupled to a sliding actuator bar 72. The actuator bar carries a pair of switch contacts 74 and 76. A load side terminal 78 including a stationary contact 80 is also provided. Electrical connection to power supply circuitry may be accomplished in a known manner using the line side terminal 78, and electrical connection to load side circuitry may be accomplished in a known manner using the load side terminal 66. A variety of connecting techniques are known (e.g., screw clamp terminals and the like) and may be utilized. The configuration of the terminals 78 and 66 shown are exemplary only.

Disconnect switching may be accomplished by rotating the switch actuator 68 in the direction of arrow A, causing the actuator link 70 to move the sliding bar 72 linearly in the direction of arrow B and moving the switch contacts 74 and 76 toward the stationary contacts 64 and 80. Eventually, the switch contacts 74 and 76 become mechanically and electrically engaged to the stationary contacts 64 and 80 and a circuit path is closed through the fuse 54 between the line and load terminals 78 and 66. When the actuator 68 is moved in the opposite direction indicated by arrow C in FIG. 19, the actuator link 70 causes the sliding bar 72 to move linearly in the direction of arrow D and pull the switch contacts 74 and 76 away from the stationary contacts 64 and 80 to open the circuit path through the fuse 54. As such, by moving the actuator 68 to a desired position, the fuse 54 and associated load side circuitry may be connected and disconnected from the line side circuitry while the line side circuitry remains "live" in full power operation.

Additionally, the fuse module 54 may be simply plugged into the fuse clips 60, 62 or extracted therefrom to install or remove the fuse module 54 from the switch housing 52. Such plug-in connection advantageously facilitates quick and convenient installation and removal of the fuse 54 without requiring separately supplied fuse carrier elements and without requiring tools or fasteners common to other known disconnect devices. Also, the fuse terminal blades 58 project from the same side of the fuse housing 56 in a generally parallel manner such that the fuse is touch safe (i.e., may be safely handled by hand without risk of electrical shock) when installing and removing the fuse 54.

In ordinary use, the circuit is preferably connected and disconnected at the switch contacts 64, 74, 76 and 80 rather than at the fuse clips 60 and 62. Electrical arcing that may occur when connecting/disconnecting the circuit may be contained at a location away from the fuse clips 60 and 62 to provide additional safety for persons installing, removing, or replacing fuses. By opening the disconnect module 50 with the switch actuator 68 before installing or removing the fuse module 54, any risk posed by electrical arcing or energized metal at the fuse and housing interface is eliminated. The disconnect module 50 is accordingly believed to be safer to use than many known fused disconnect switches.

As should now be evident, the switching disconnect device 50 provides fused circuit protection and switching capability in a modular package that obviates any need for a circuit breaker that commonly has been used in certain panelboards to provide switching capability. The costs of circuit breaker may be avoided, together with costs associated of having to separately wire or connect the circuit breaker to the fuse in a panelboard assembly. As the number of branch circuits increase in the panelboard assembly, the cost savings become even more pronounced.

Additionally, the disconnect device 50 is rather compact and can easily occupy less space in a fusible panelboard assembly than in-line fuse and circuit breaker combinations. In particular, CUBEFuse™ power fuse modules occupy a smaller area, sometimes referred to as a footprint, in the panel assembly than non-rectangular fuses having comparable ratings and interruption capabilities. Reductions in the size of panelboards are therefore possible.

Still further, the practical limitations on the interrupting ratings of the panelboard assembly by virtue of the circuit breakers are no longer an issue, and higher interrupting ratings are possible for fusible panelboards.

Additional details and features for devices such as the device 50 are more completely described in the commonly owned and co-pending U.S. patent application Ser. No. 11/941,212 now issued U.S. Pat. No. 7,855,873, that has been incorporated by reference above. Fuse state monitoring features and tripping features described therein, among other things, present additional points of desirability of the switching disconnect devices for panelboard applications.

Figure 1:
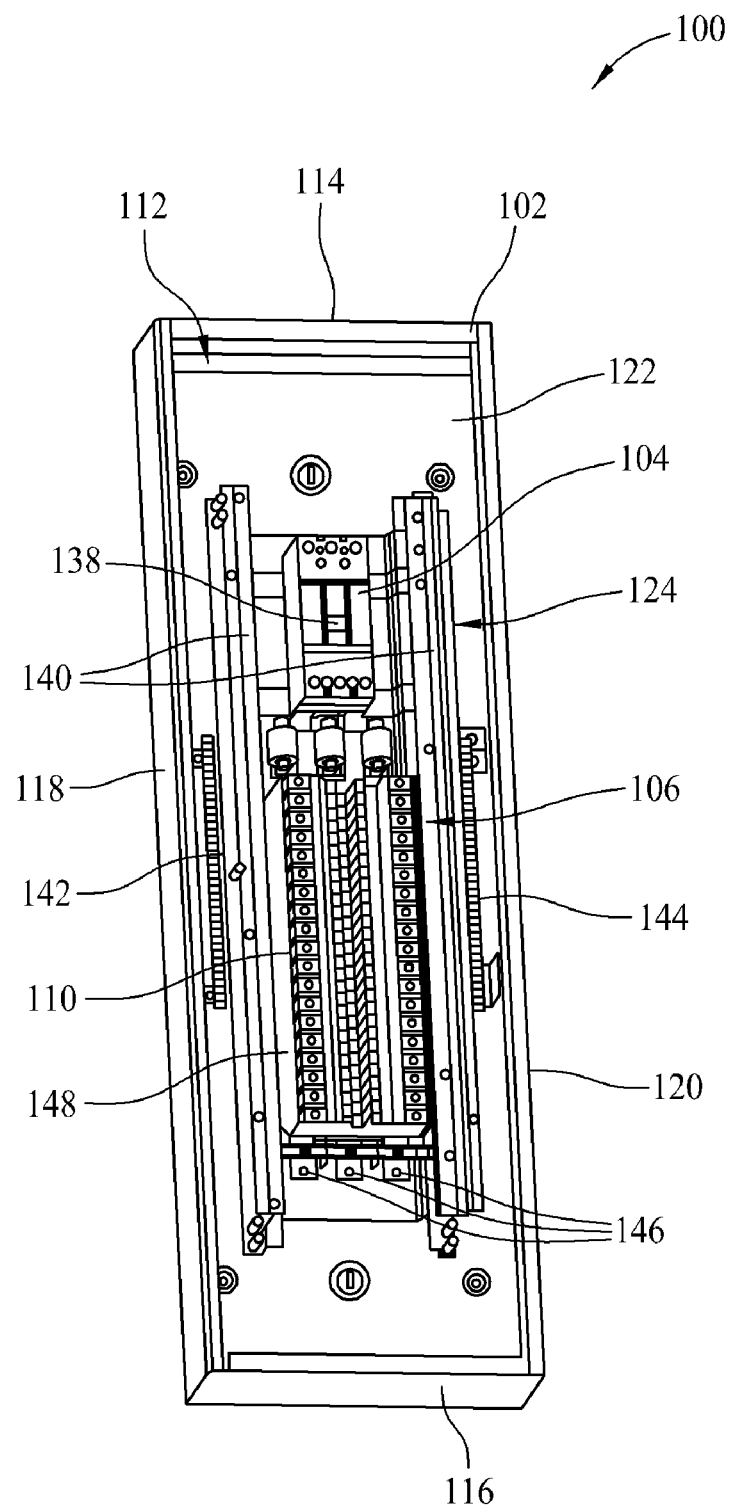
FIG. 1 is a perspective view of an exemplary mounting enclosure, main service disconnect, and chassis of an exemplary fusible panelboard.
Figure 2:
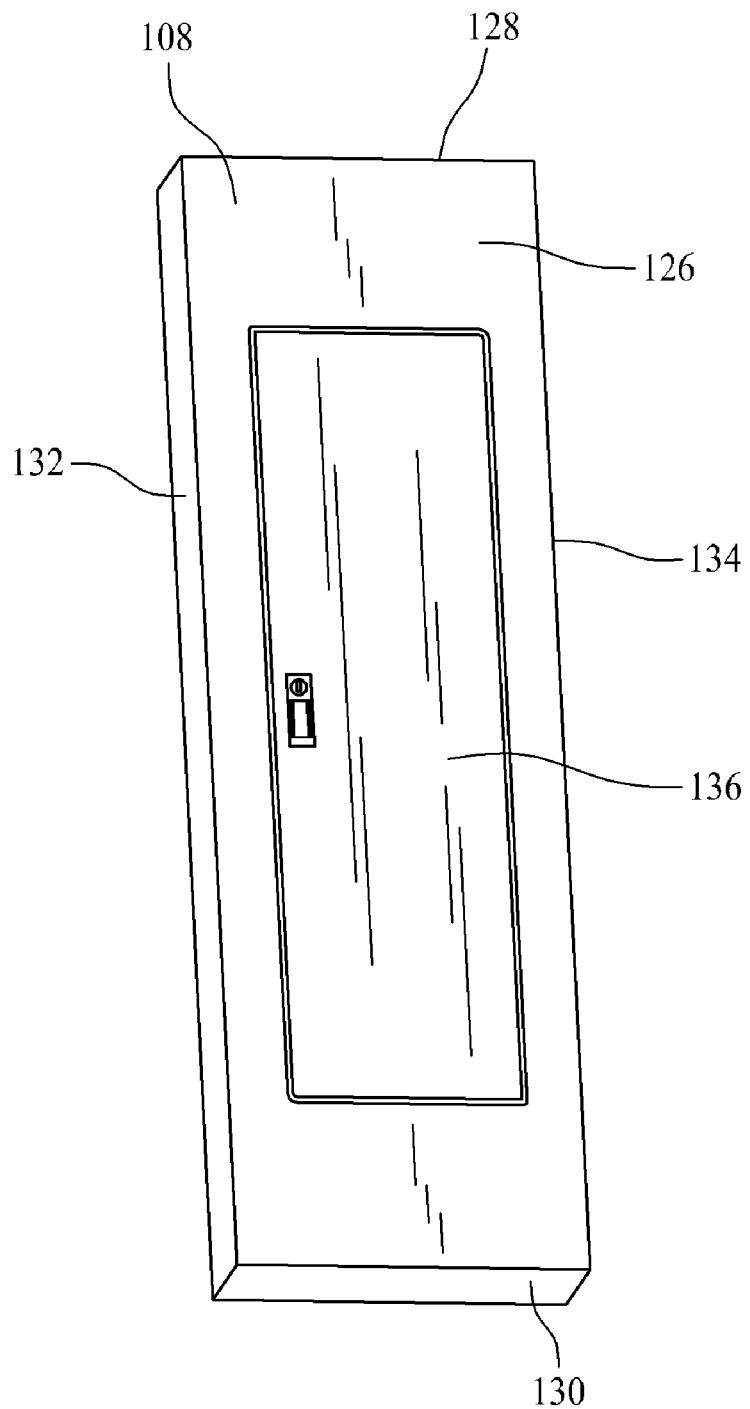
FIG. 2 is a perspective view of an exemplary panelboard cover configured to mate with the mounting enclosure of FIG. 1.

FIG. 1 is a perspective view of an exemplary fusible panelboard assembly 100 including a mounting enclosure 102, a main service device 104, and chassis 106. FIG. 2 is a perspective view of an exemplary panelboard cover 108 configured to mate with the mounting enclosure 102 of FIG. 1. The mounting enclosure 102 is configured to receive multiple fusible switching disconnect devices 110, which may correspond to the devices 50 (FIG. 19) including rectangular fuse modules 54.

The mounting enclosure 102 includes a substantially rectangular, metallic frame 112 having a top edge 114, a bottom edge 116, left and right side edges 118 and 120, and a back panel 122. The edges 114, 116, 118 and 120 and the panel 122 of the frame 112 define a space 124 in which the main service device 104, the chassis 106, and the fusible switching disconnect devices 110 are mounted. In various embodiments, the mounting enclosure 102 may be fabricated from metallic or non-metallic materials, including but not limited to aluminum sheet metal that is suitable for indoor or outdoor use. In exemplary embodiments, the mounting enclosure 102 may also comply with an industry standard for electrical equipment, including, without limitation, a National Electrical Manufacturers Association (NEMA) standard for NEMA type 1, NEMA type 3R or other NEMA type enclosures.

The mounting enclosure 102 may be configured to be flush-mounted or surface-mounted against a wall or other supporting structure. In such a flush mount installation, the mounting enclosure 102 may be recessed within a hole in the wall. In a surface mount installation, the mounting enclosure 102 may be attached to (and project outwardly from) the wall or support structure.

The cover 108 (FIG. 2) is shaped and dimensioned so as to correspond to the shape of the mounting enclosure 102 (FIG. 1). In particular, and in the exemplary embodiments shown in FIG. 2, the cover 108 includes a front panel 126 and outer edges 128, 130, 132 134 configured to slidably engage outer surfaces of the edges 114, 116, 118, 120 of the mounting enclosure 102 (FIG. 1). The cover 108 (FIG. 2) also includes a door 136, which an operator may open to access the fusible switching disconnect devices 110 (FIG. 1). The mounting enclosure 102 and cover 108 may provide "deadfront" safety protection, meaning that the fusible panelboard is configured such that a person cannot make contact with any energized or "live" electrical parts or components that may present a risk of electrical shock.

The main service device 104 provides the live power that energizes branch circuits associated with the fusible switching disconnect devices 110. For example, the main service disconnect device 104 may include non-switchable lug-type connections, a circuit breaker, a fuse, a non-fused disconnect switch and/or a fusible switching disconnect device in various embodiments. By way of example only, in certain exemplary embodiments the main service disconnect device 120 can include a mechanical or compression 100-800 Amp lug, a Class T fuse with an Eaton or Siemens brand molded case switch 250 A series G, a Class T fuse with a 200 Amp or 400 Amp BOLTSWITCH® brand pullout switch, an IEC/UL power fuse, or a 225 Amp sub feed lug. The main service device 104, where applicable, may also include a switch actuator 138 by which an operator can turn the live power on and off (i.e., connector or disconnect the power supply to the panelboard assembly 100).

The chassis 106 in an exemplary embodiment includes a pair of support rails 140, a ground bar 142, a neutral bar 144, and multiple hot bus bars 146. In operation, the live power flows through the main service disconnect device 104 to each of the hot bus bars 146. The hot bus bars 146 provide, in turn power to the branch circuits via the fusible switching disconnect devices 110. Each fusible switching disconnect device 110 is mounted to a mounting support 148 (also shown in FIG. 3) coupled to one of the support rails 140, and a branch connector 150 (shown in FIGS. 3 and 6) coupled to one or more hot bus bars 146. In alternative exemplary embodiments, each fusible disconnect device 110 may be mounted directly to the support rail 140 and/or the hot bus bar(s) 146.

Varying the number of hot bus bars 146 to which a fusible switching disconnect device 110 is electrically coupled (via the branch connector 150) can vary the voltage of the electricity provided by each fusible switching disconnect device 110 to its corresponding branch circuit. For example, a fusible switching disconnect device 110 electrically coupled to two of the hot bus bars 146 may carry 240V for its branch circuit, while a fusible switching disconnect device 110 electrically coupled to only one of the hot bus bars 146 may carry 120V for its branch circuit.

The chassis 106 in various embodiments may assume many different, suitable electrical configurations. For example, the chassis 106 can be configured to receive 12, 18, 24, 30, 36, 42, or any other suitable number of fusible switching disconnect devices 110. The chassis 106 also can be configured to provide, for example, single phase 3 wire, single phase 2 wire, or three phase 4 wire power via the fusible switching disconnect devices 110. Certain exemplary embodiments of a distributed phase configuration are described below with reference to FIG. 6.

The fusible switching disconnect devices 110 integrate fused circuit protection and switching capability in a single, relatively compact device that does not require or otherwise involve a circuit breaker to selectively coordinate critical loads connected to the panelboard via the branch circuits corresponding to the devices 110. The compactness of the fusible switching disconnect devices 110 allows the fusible panelboard to provide a higher level of overcurrent interruption in a smaller space than with traditional panelboards. Whereas traditional fusible panelboards generally have a width of at least 28 inches, fusible panelboards with the exemplary mounting enclosure 100 and switching disconnect devices 110 have a lesser width, on the order of about 20 inches. The depths and heights of the traditional and exemplary panelboard assembly 100 are, however, substantially equal.

Interruption ratings per volume of a fusible panelboard assembly 100 including the devices 110 is approximately 33 Amps per cubic inch in one embodiment. This value is significantly higher than in traditional panelboards, which generally have interruption rating per volume values of between 2 and 8 Amps per cubic inch. Table 1 below summarizes and compares interrupting rating per volume values for multiple different panelboards, including traditional panelboards and the fusible panelboard assembly 100.

TABLE 1

| Panelboard type | Volume 42 branch circuits (in3) | Max Voltage (V) | Withstand Rating fully rated (A) | Max Voltage/ Volume (V/in3) | Interrupting Rating/ Volume (A/in3) |
| --- | --- | --- | --- | --- | --- |
| Fusible panelboard assembly 100 | 7360.0 | 600 | 200,000 | 0.081 | 33 |
| Traditional Panelboards | | | | | |
| Eaton Type PRL2A 225A | 5750.0 | 480 | 14,000 | 0.0835 | 2 |
| Siemens P1 225A | 5060.0 | 480 | 14,000 | 0.0949 | 3 |
| Square D NF MB panelboards 100/250A | 7820.0 | 480 | 65,000 | 0.0614 | 8 |
| GE Type AE Pro-stock 225A | 5692.5 | 480 | 14,000 | 0.0843 | 2 |

Figure 3:
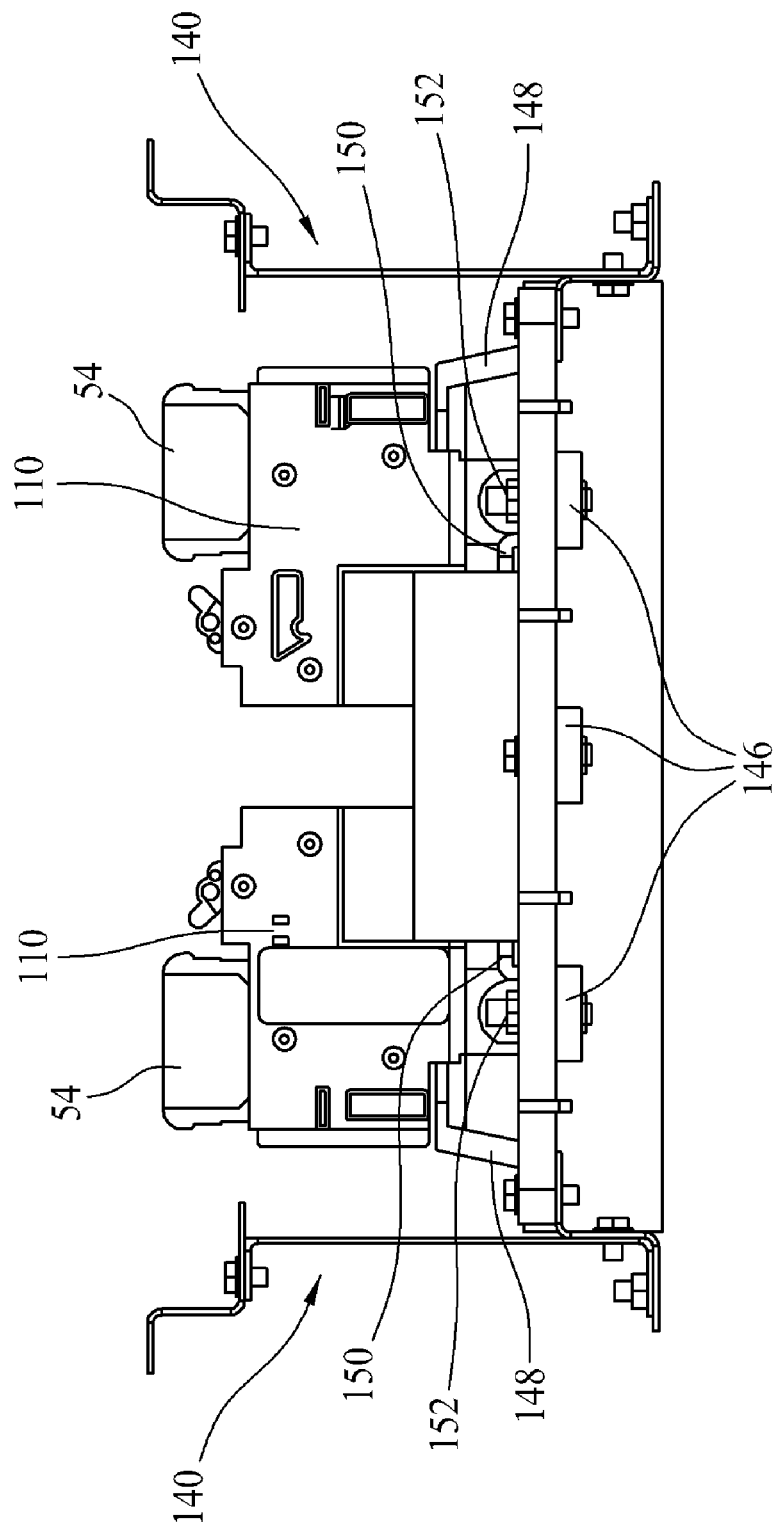
FIG. 3 is a perspective view of exemplary fusible disconnect devices connected to exemplary bus bars and support rails.

FIG. 3 is a perspective view of exemplary fusible disconnect devices 110 connected to exemplary busbars 146 and support rails 140. Each fusible disconnect device 110 is mounted to a mounting support 148 coupled to one of the support rails 140, and a branch connector 150 coupled to one or more hot bus bars 146 via an electrical connection point 152. In alternative embodiments, each fusible disconnect device 110 may be mounted directly to the support rail 140 and/or the hot bus bar(s) 146.

Figure 4:
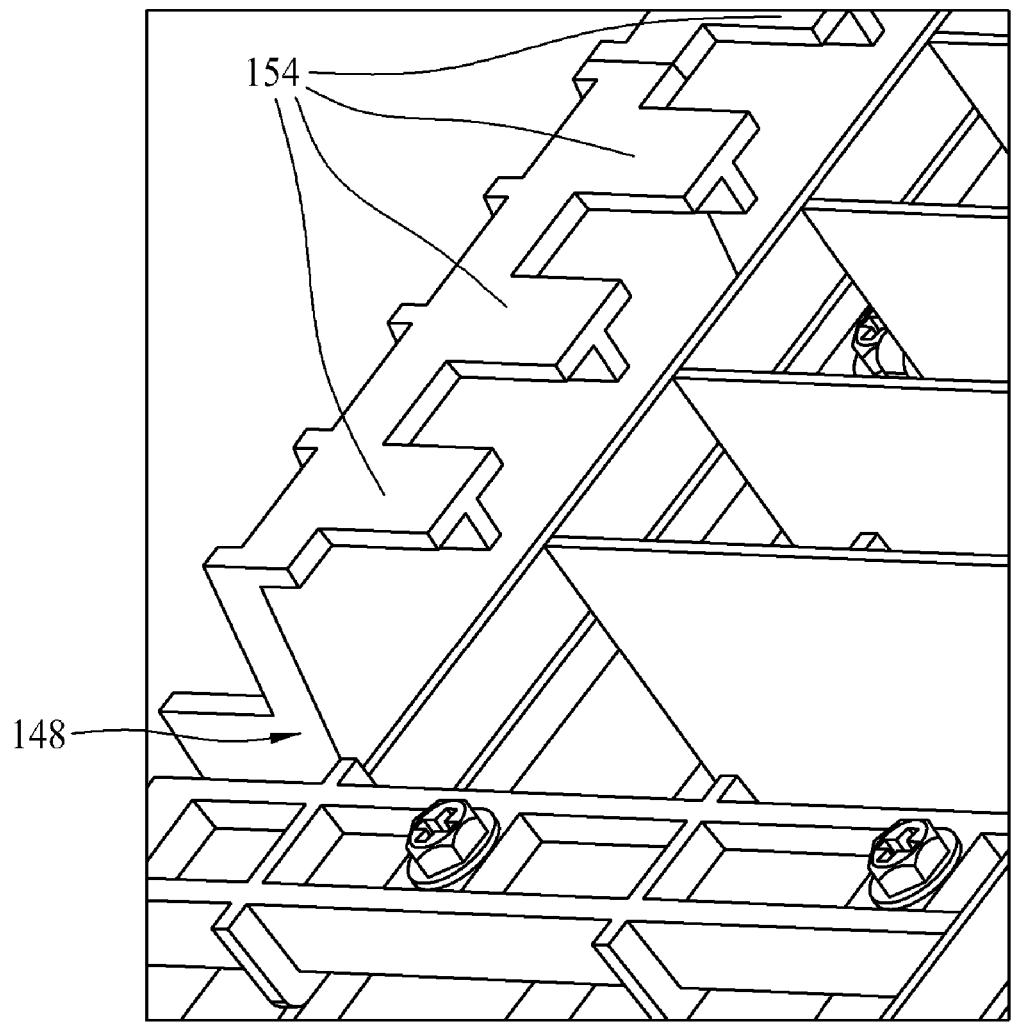
FIG. 4 is a perspective view of an exemplary mounting support configured for mounting a fusible disconnect device to a support rail.
Figure 5:
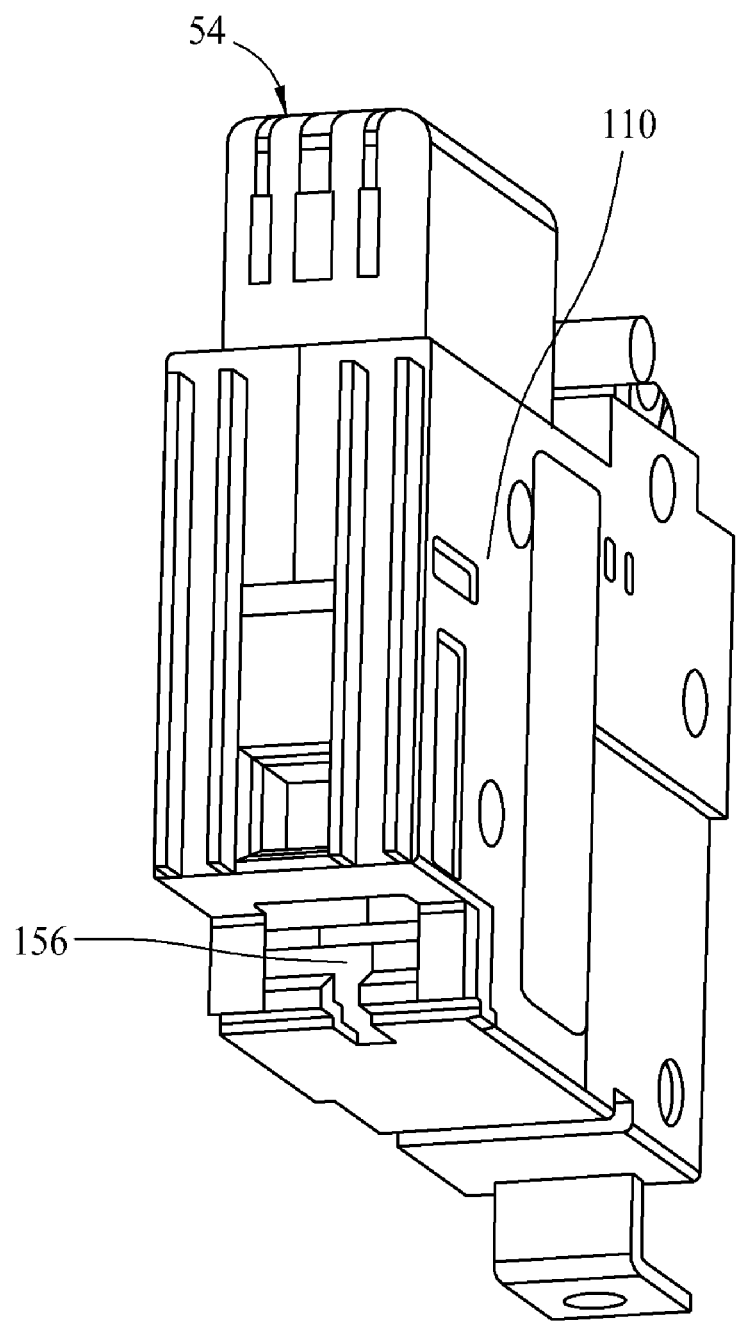
FIG. 5 is a perspective view of an exemplary fusible disconnect device configured for mounting to the mounting support of FIG. 4.

FIG. 4 is a perspective view of an exemplary mounting support 148. FIG. 5 is a perspective view of an exemplary fusible disconnect device 110 configured for mounting to the mounting support 148 of FIG. 4. In an exemplary embodiment the mounting support 148 includes multiple "T"-shaped protrusions 154 (FIG. 4), each of which is configured to engage a corresponding "T"-shaped notch 156 (FIG. 5) of a fusible disconnect device 110. The protrusions 154 can prevent installation within the fusible panelboard of an incompatible device that does not have such a corresponding notch 156. Thus, the protrusions 154 may prevent installation of inappropriate or undesired devices, such as traditional circuit breaker devices with unsuitable interruption ratings. It is recognized, however, that similar functionality could be provided in another manner. For example, the mounting support 148 may include a notch configured to receiving a corresponding protrusion of the fusible disconnect device 110. The notches and protrusions of the mounting support 148 and devices 110 may be formed in any suitable shape.

It is likewise recognized that the notches 154 and protrusions 156 as described may be considered optional in some embodiments. As such, the mounting support 148 need not include the protrusions 154 and/or each fusible disconnect device 110 need not include the notch 156.

Figure 6:
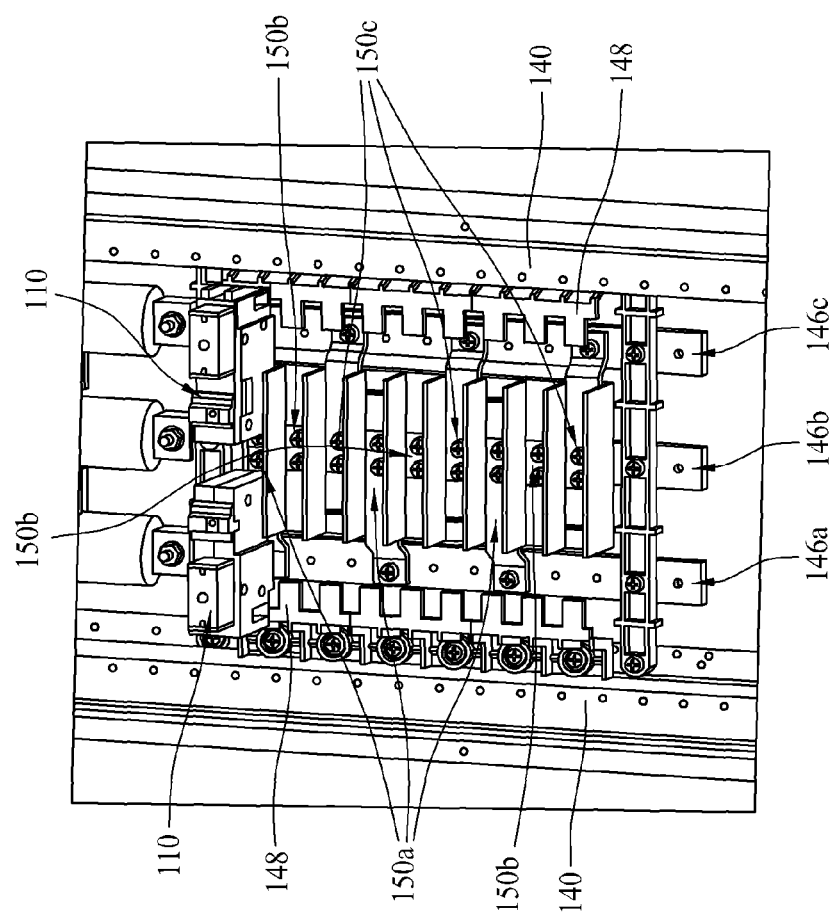
FIG. 6 is a perspective view of exemplary busbars, support rails, and fusible disconnect devices connected in a distributed phase configuration.

FIG. 6 is a perspective view of exemplary bus bars 146, support rails 150, and fusible disconnect devices 110 connected in a distributed phase configuration. Each bus bar 146 is connected to a different phase of electrical current. Specifically, bus bar 146a is connected to a first phase of electrical current ("Phase A"); bus bar 146b is connected to a second phase of electrical current ('Phase B"); and bus bar 146c is connected to a third phase of electrical current ("Phase C").

Fusible disconnect devices 110 can connect to the different phases of electrical current via branch connectors 150a, 150b, and 150c coupled to the busbars 146. Each of the branch connectors 150a is associated with Phase A; each of the branch connectors 150b is associated with Phase B; and each of the branch connectors 150c is associated with Phase C. Each fusible disconnect device 110 is mounted to a mounting support 148 coupled to one of the support rails 140, and a branch connector 150 coupled to one or more of the hot bus bars 146. The configuration illustrated in FIG. 6 is merely exemplary, however, and other suitable configurations may be used in alternative embodiments.

Figure 7:
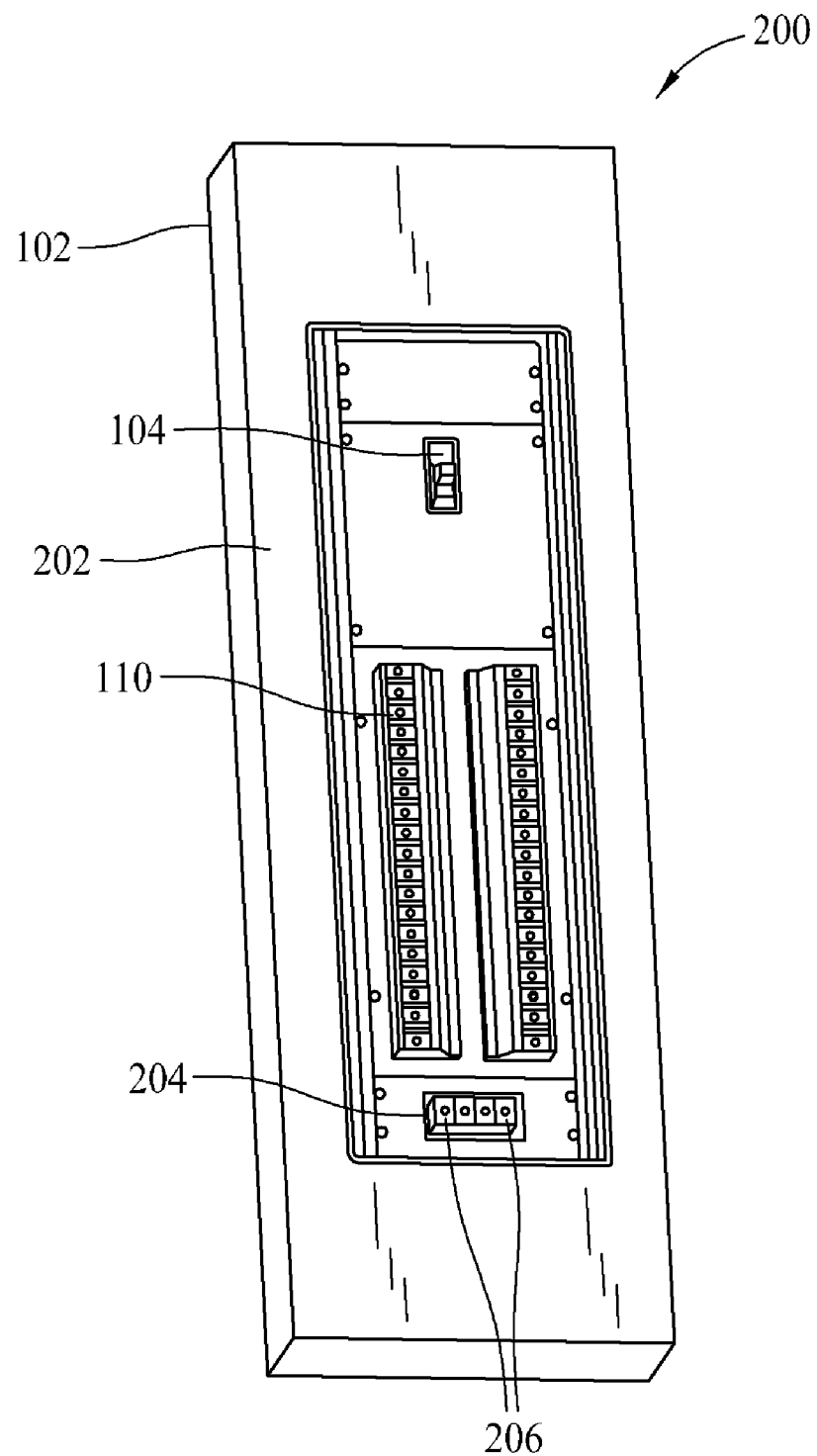
FIG. 7 is a perspective view of an exemplary mounting enclosure, main service disconnect, fusible disconnect devices, and deadfront panel of an exemplary fusible panelboard.

FIG. 7 is a perspective view of another exemplary panelboard assembly 200 similar to the assembly 100. The assembly 200 includes a mounting enclosure 102, a main service disconnect device 104, fusible switching disconnect devices 110, and a deadfront panel 202 of an exemplary fusible panelboard. The deadfront panel 202 is coupled to the mounting enclosure 102 and configured to be disposed between the mounting enclosure 102 and the cover 108 of FIG. 2. For example, an operator may see the deadfront panel 202 upon opening the door 136 (FIG. 2) of the cover 108.

The deadfront panel 202 includes an exemplary spare fuse holder 204 configured to receive one or more spare fusible disconnect devices 206. For example, the fusible disconnect devices 206 can be substantially identical to the fusible disconnect devices 110. The spare fusible disconnect devices 206 are not electrically coupled to the bus bars 146 (FIG. 1) of the fusible panelboard or any branch circuits coupled thereto. Rather, the fusible disconnect devices 206 are configured to rest within the spare fuse holder 204 until removed by an operator. For example, an operator can remove a fusible disconnect device 206 from the spare fuse holder 204 in order to replace a fusible disconnect device 110 with the fusible disconnect device 206.

Figure 8:
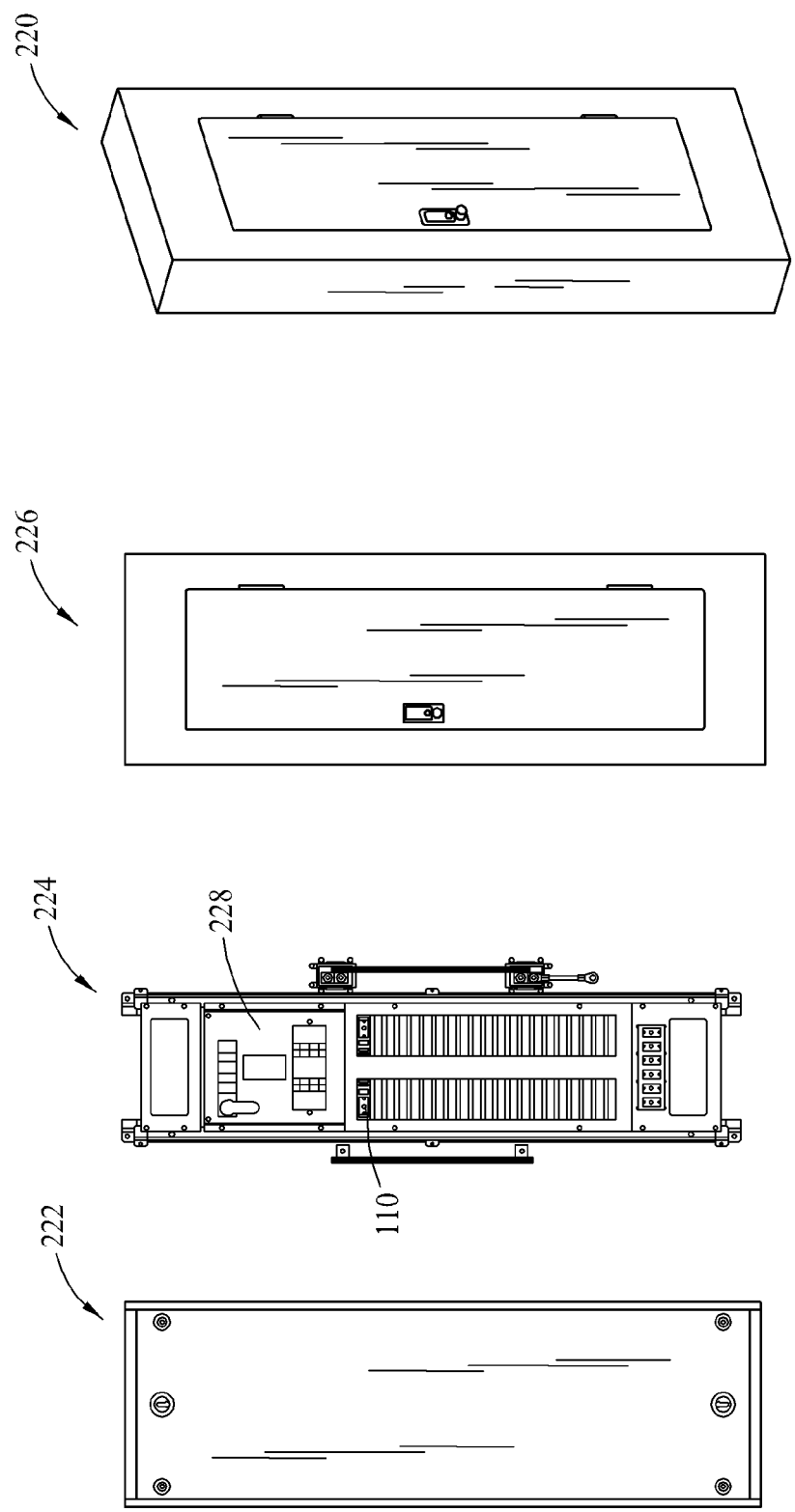
FIG. 8 is an exploded view of an exemplary fusible panelboard.

FIG. 8 is an exploded view of an exemplary fusible panelboard assembly 220 similar to the panelboard 100 (FIG. 1) previously described in many aspects. Like the panelboard assembly 100, the assembly 220 includes an enclosure 222, a chassis 224 and a door 226 movable relative to the chassis 224 between an open position (not shown) providing access to the chassis 224 and a closed position (shown in FIG. 1) blocking access to the chassis 224. The chassis 224 may include a main service disconnect device 228 such as any of those described above. As these features have been previously described in detail above in relation to the assembly 100, further details will not be repeated here, and the reader is referred back to the previous discussion of these elements.

Unlike the assembly 100, in the panelboard assembly 200, the chassis 224 is configurable to interchangeably accommodate fusible switching disconnect devices 110 (which may correspond to the devices 50 shown in FIG. 19) of different ratings, and hence different sizes. As those in the art would understand, because of the manner in which the rectangular fuse modules 54 (FIG. 19) are constructed, the physical size of the fuse modules 54 is increased, and accordingly the size of the switch housing 52 (FIG. 19) in the devices 50 to accommodate the fuse modules 54 must accordingly be increased. More specifically, the lateral spacing between the terminal blades 58 of the fuse 54, measured in a direction normal or perpendicular to the plane of the blades 58, increases as the fuse rating increases. Also, the size of the terminal blades 58, as well as the internal fuse element assembly, increases as the rating of the fuse is increased. As a result, a rectangular CUBEFuse™ module having a 30 A rating is smaller in dimension (length, width and height) than a CUBEFuse™ having a 60 A rating, and a CUBEFuse™ module having a 60 A rating is smaller in dimension (length, width and height) than a CUBEFuse™ having a 100 A rating. In the CUBEFuse™ example, fuse modules having ratings of 1-30 A are available in a first module size, fuse modules having ratings of 40-60 A are available in a second module size larger than the first module size, and fuse modules having ratings of 70-100 A are available in a third module size larger that the second module size. Other amperage ratings, or ranges of ratings, are of course possible.

As explained below, the chassis 224 is configured to interchangeably receive a plurality of fusible switching disconnect modules 110 of various sizes and ratings that may be selected for a particular end use application. The panelboard assembly 200 may be safely and easily configurable for specific use either at the manufacturer level or at the end user level. Such safety and configurability is provided, as will be explained below, using relatively low cost and modular components providing substantially flexibility to the end user to adapt them for specific use. That is, customized manufacture of the panelboard assembly is avoided while still providing some ability for the end user to customize the assembly for particular use. Further features are also provided to reduce the size of the overall panel assembly with concomitant practical benefits.

Figure 14:
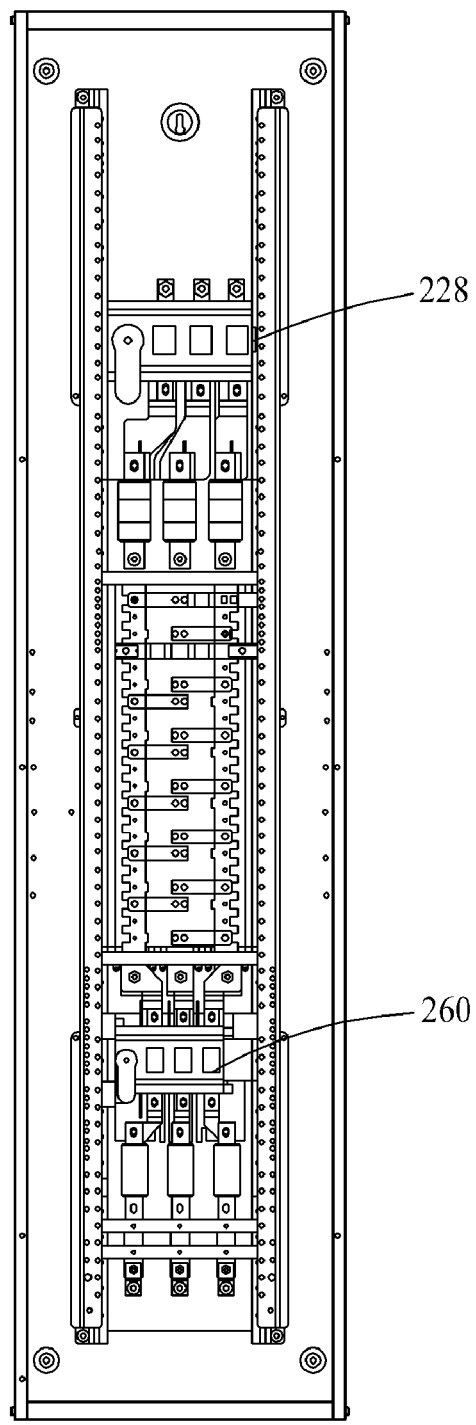
FIG. 14 is a full elevational view of the panel shown in FIG. 13.

FIGS. 9-12 illustrate exemplary barrier elements 240 that may be utilized in the panel assembly 220. The barrier elements 240 surround and enclose the terminals 238 that connect the main service device 228 (FIG. 8) and the bus bars of the chassis 224 and physically isolate them from one another. When the main service device 228 is itself fused (possibly with non-rectangular fuses as shown in FIG. 14), the fuses may be contained within the confines of the barrier elements 240.

Figure 9:
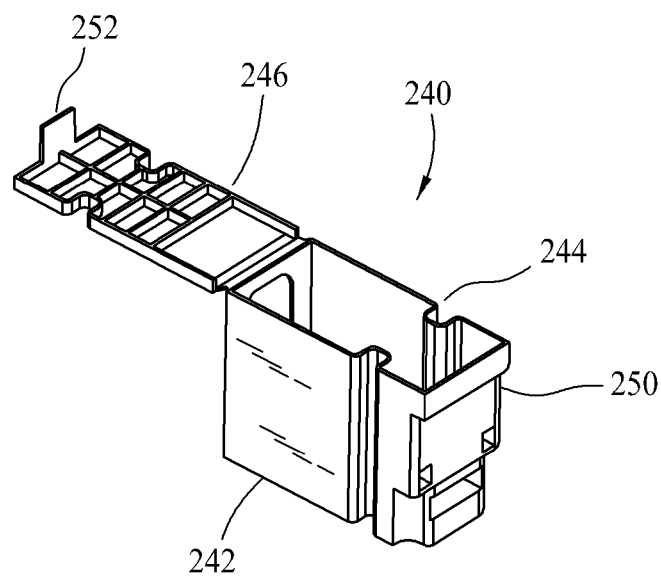
FIG. 9 is a perspective view of an exemplary main terminal element barrier with integral cover in an opened position.
Figure 10:
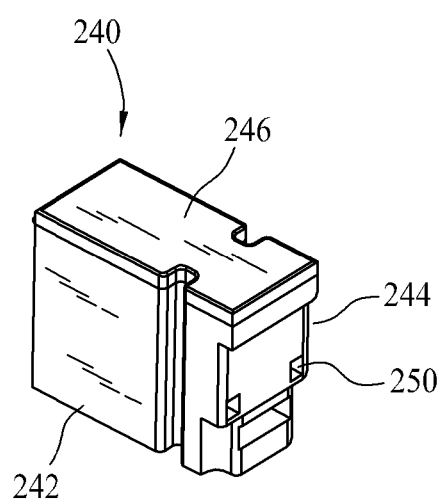
FIG. 10 is a perspective of the main terminal element barrier shown in FIG. 9 with the integral cover in a closed position.
Figure 11:
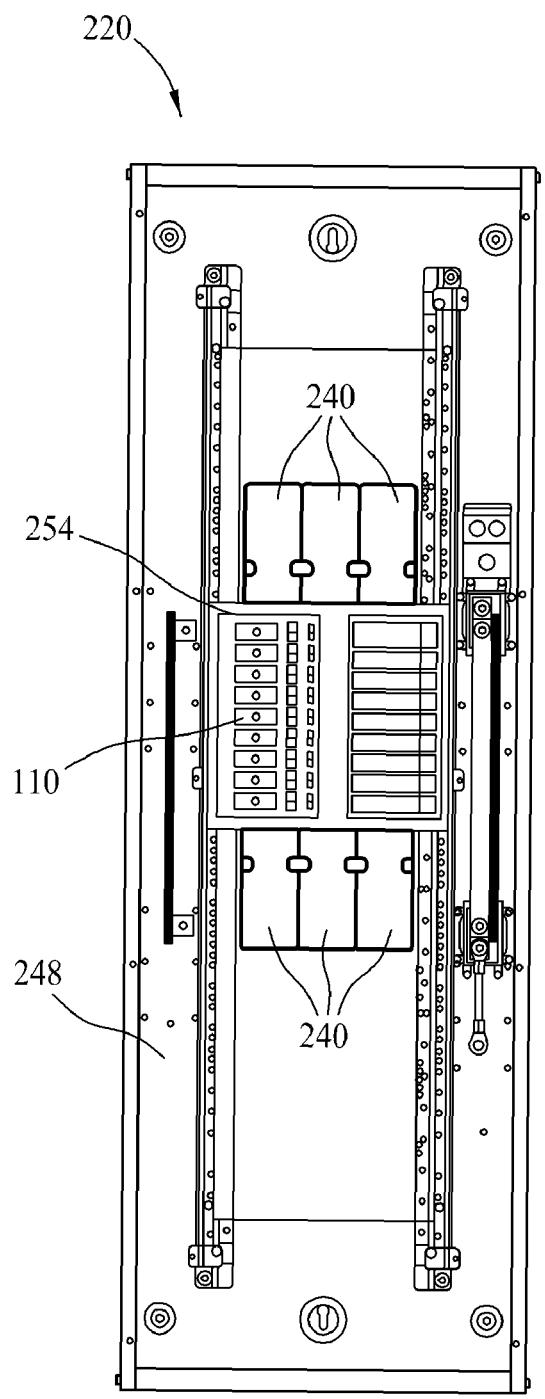
FIG. 11 is a front elevational view of a portion of the panel board with main terminal element barriers installed and the covers in a closed position.
Figure 12:
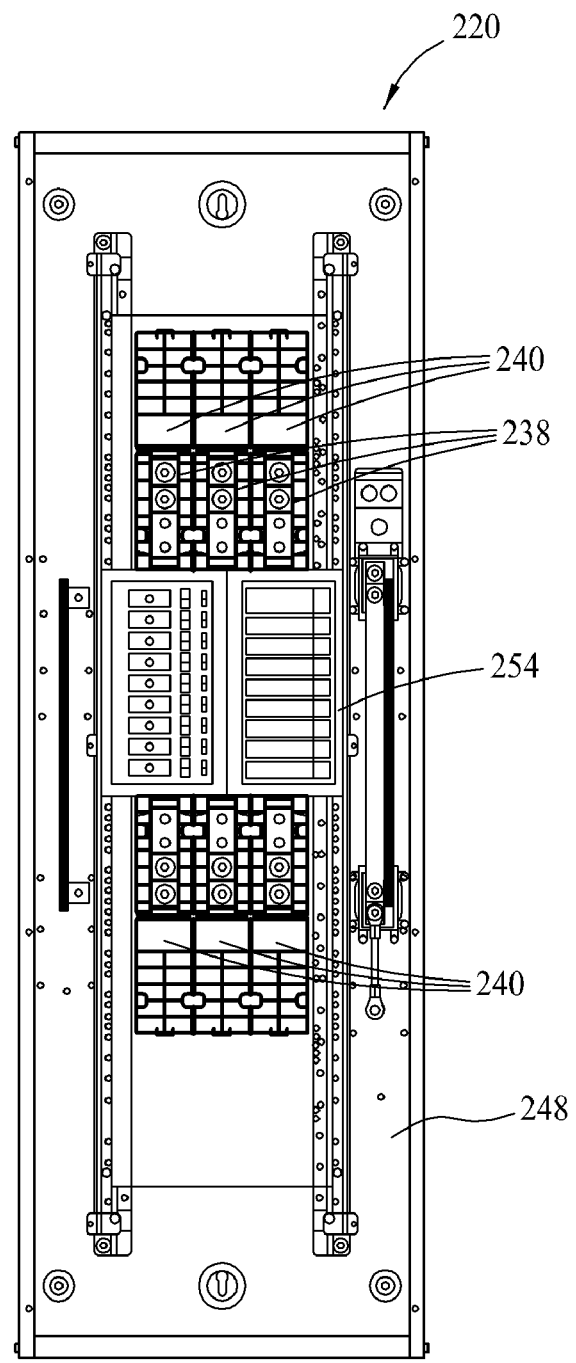
FIG. 12 is a front elevational view similar to FIG. 11 but showing the covers in an opened position.

As shown in FIGS. 9 and 10, the barrier elements 240 include side walls 242, 244 and an integral cover 246 movable via a living hinge in the example shown between an opened position (FIGS. 9 and 11) and a closed position (FIGS. 10 and 12). When installed, the side walls 242, 244 separate adjacent terminals 238 on the chassis from one another and prevent short circuit conditions that could inadvertently be created between the terminals 238. When closed, the covers 246 enclose and prevent any access to the terminals 238 when the panel door is removed as shown in FIG. 11. Furthermore, a configurable branch circuit cover 254 is also provided to prevent potential exposure to live portions of the chassis in the vicinity of the switching disconnect devices 110. As such, a deadfront working area is provided even when the panel door is not present.

Additionally, when a panel door trim 248 is removed, the terminals 238 are protected on the front and the sides and a technician, for example, is substantially protected from inadvertent contact with energized, live portions of the terminals 238 while servicing the panel.

The barrier element covers 246 may, when desired, be opened to provide access to the terminals 238. In the example shown a simple latch 250 is formed into one end of the barrier element 240 and a latch tab 252 is provided on an end of the cover 252. The latch tab 252 in this example may be rather easily latched or released with a snap-fit engagement or release by applying slight pressure to the latch tab 252. Other latching features or locking arrangements are of course possible. It is also contemplated that in another embodiment the cover 246 need not be integral to the barrier elements 240 and could be separately provided and attached. Further, it is recognized that a hinged cover is not required and may be considered optional in favor of another coupling feature.

The barrier element covers 246 are independently operable from the panel door 226 (FIG. 8) and vice versa. When the covers 246 are closed (FIG. 11) and the panel door 226 is closed, the covers 246 provide electrical insulation between the live electrical portions of the chassis 224 and the deadfront door 226, which allows the panel depth of the assembly to be reduced to a comparatively small value (about 5.75 inches in one example) than would otherwise be required without the covers.

While three pairs of barrier elements 240 are shown in FIGS. 11 and 12, it is understood that other numbers of barrier elements both greater or fewer may alternatively provided, and also that barrier elements could be provided at locations other than the particular locations shown in further and/or alternative embodiments. Moreover, the use of such barrier elements need not necessarily be solely in relation to the main service device 228 (FIG. 8) but rather may be utilized to enclose any other portion of an energized component or conductor (e.g. a portion of a bus bar or a connector component).

Figure 13:
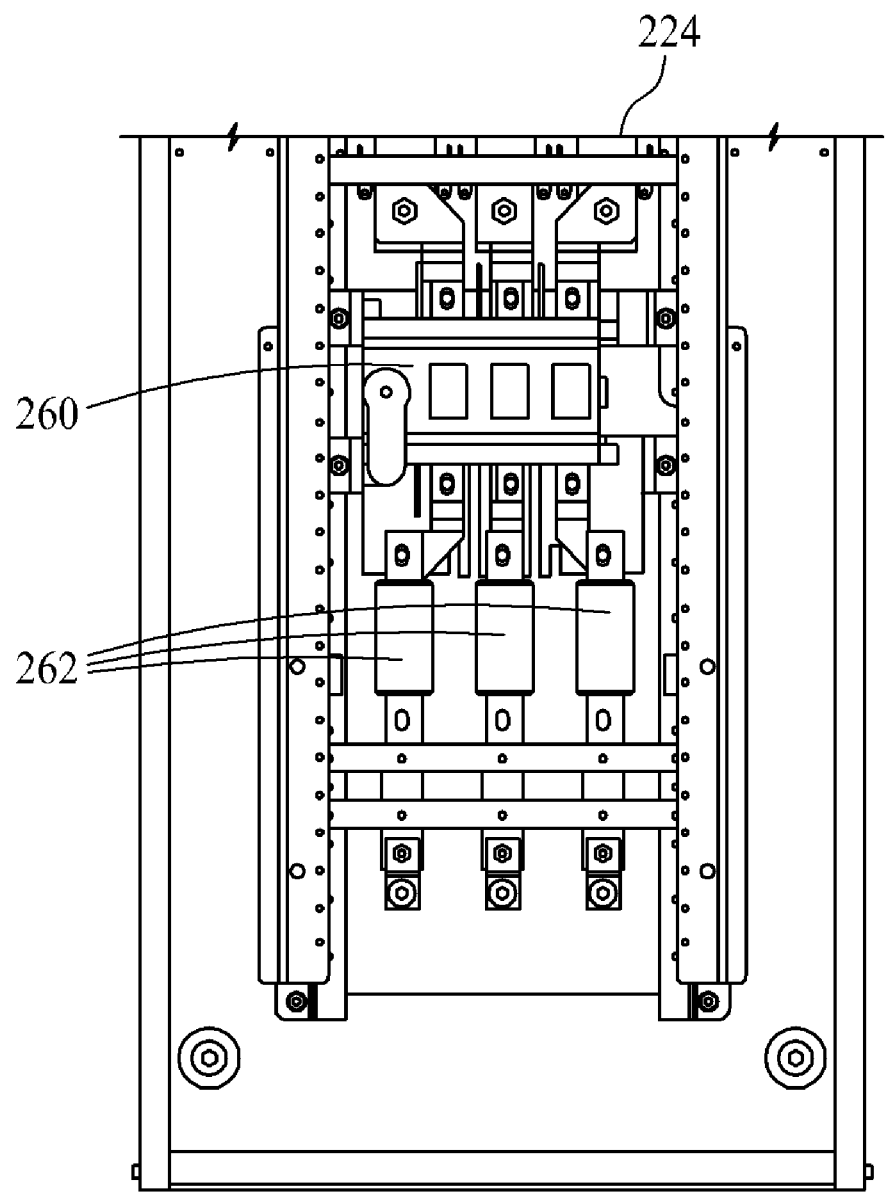
FIG. 13 is a partial front elevational view of a portion of the panel board showing an integral load side disconnection switch.

FIG. 13 is a partial front elevational view of a portion of the panel board assembly 220 and FIG. 14 is a full assembly view illustrating an integral load side disconnection switch 260 coupled to the chassis 224 in a lower portion thereof. The load side switch 260 is connected to the hot bus bars of the chassis 224 and may connect or disconnect feeder circuits to the panelboard in a distinct manner from the branch circuits associated with the fusible switching disconnect devices 110. As shown in FIG. 13, non-rectangular fuses 262 may be connected to the load side switch 260.

The integral load side switch 260 simplifies installation of the panel board assembly by eliminating any need to separately wire and connect a load side switch. Space savings are also achieved as accommodating a separately provided and wired switch would practically inevitably require an increased amount of installation space.

The load side switch 260, in addition to the main service device 228 that may also be switchable, provides still further possibilities to selectively coordinate the loads connected to the panel for fault purposes as well as service and repair of the larger electrical system. In an exemplary embodiment, the main service device 228 may have a much higher rating (e.g., at least 225V) than the load side switch (e.g., at least 110V). Other variations and other ratings are contemplated in further and/or alternative embodiments.

Figure 15:
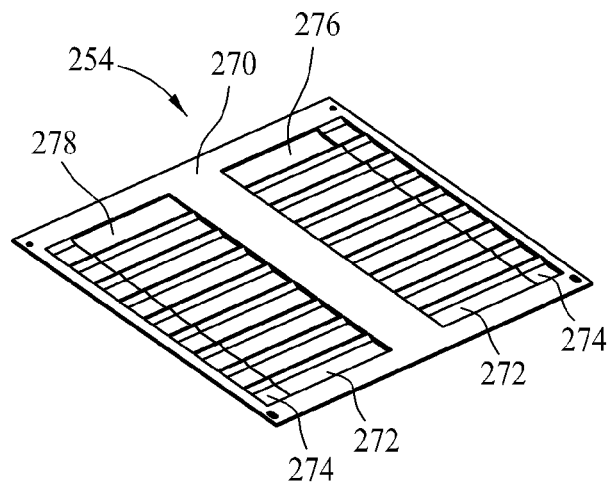
FIG. 15 is a perspective view of an exemplary configurable branch enclosure cover for a fusible panelboard.
Figure 16:
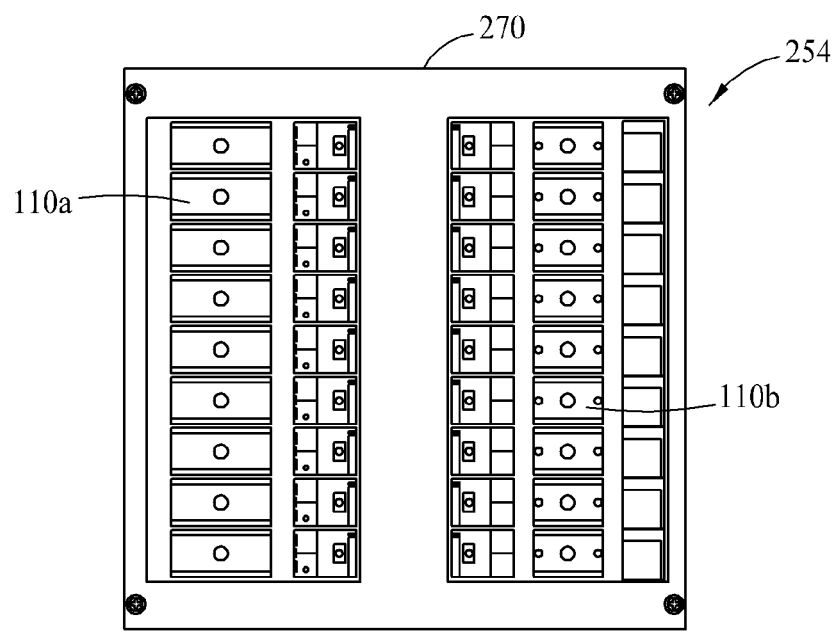
FIG. 16 is an elevational view showing the configurable branch enclosure cover with exemplary fusible switching disconnect modules/
Figure 17:
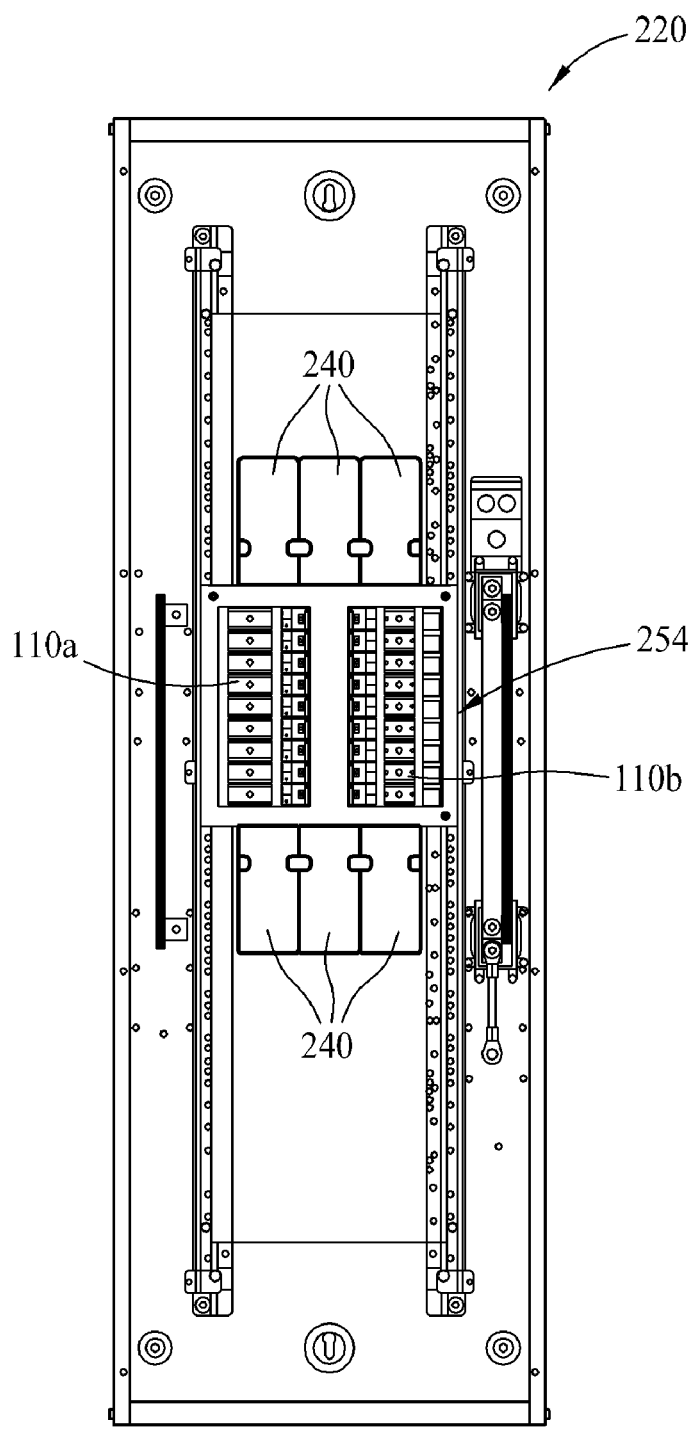
FIG. 17 shows the configurable branch enclosure cover and fusible switching disconnect modules installed to a fusible panelboard.

FIG. 15 is a perspective view of the configurable branch enclosure cover 254 (also shown in FIGS. 11 and 12) for the fusible panelboard assembly 220. FIG. 16 shows the configurable branch enclosure cover with exemplary fusible switching disconnect modules 110. FIG. 17 shows the configurable branch enclosure cover 254 and fusible switching disconnect modules 110 installed to the fusible panelboard assembly.

As shown in FIG. 15, the configurable branch cover 254 is a substantially planar element having a frame 270 and a series of perforations defining knockout portions 272 and 274 that are selectively removable from the frame 272. The series of knockout portions 272 and 274 are arranged in an array of two columns in the example shown, with the knockout portions 272 and 274 arranged in mutual adjacent pairs in each column. Other arrangements are of course possible in other embodiments.

Specifically, the knockout portions 272 each respectively define an area corresponding to a rectangular opening 276 of a first size that is sufficient to accommodate and surround a fusible switching disconnect device of a first rating. The knockout portions 274 each respectively define an additional area immediately proximate one of the first knockout portions 272, such that a larger rectangular opening 278 may be defined when the both the first and second knockout portions 272 and 274 are removed.

As shown in FIGS. 16 and 17 when the first knockout portions 272 are removed from the frame 270, the resultant openings 276 (FIG. 15) may accommodate a fusible switching disconnect device 110b having a lower fuse rating such as 30 A or 60 A CUBEFuses™. When both the knockout portions 272 and 274 are removed the resultant openings 278 may accommodate fusible switching disconnect devices 110a having a larger fuse rating such as a 100 A CUBEFuses™ Thus, by selectively removing the knockout portions, varying fuse ratings can be accommodated in any of the branch circuits.

Additionally, the configurable cover 254 can safely cover unused connections on the chassis for branch circuitry, and when needed the cover can easily be reconfigured by removing additional knockout portions as additional branch circuitry is added to the panel. Thus, a panelboard assembly having a larger number of branch circuit capabilities than actually needed can be installed, with the configurable cover 254 still providing deadfront protection and while allowing for ease of future expansion of the electrical system to include additional branch circuits.

Figure 18:
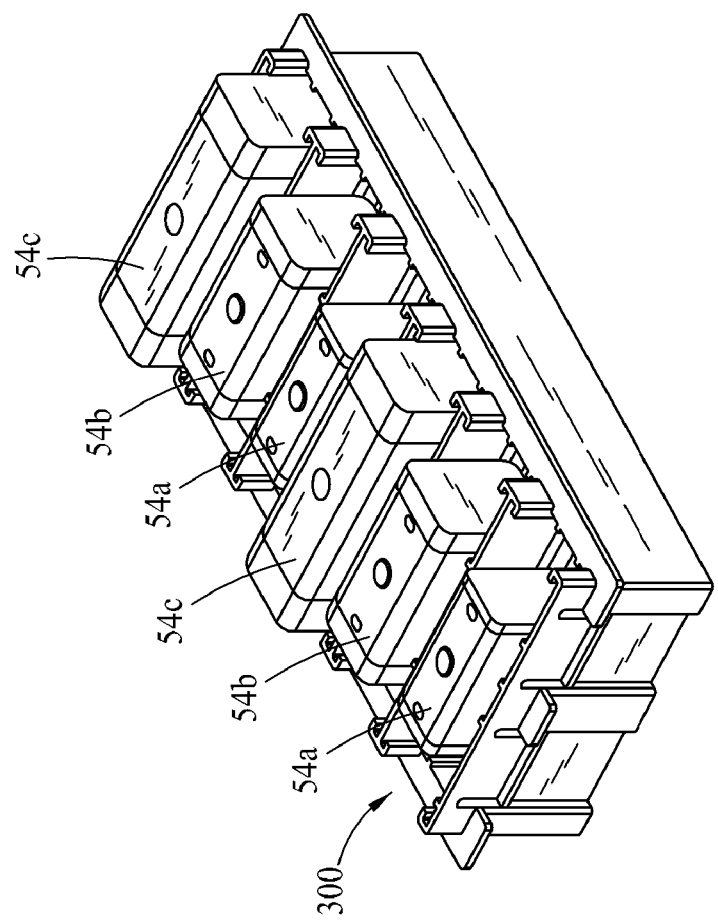
FIG. 18 illustrates an exemplary spare fuse holder for a fusible panelboard.

FIG. 18 illustrates an exemplary spare fuse holder 300 for the fusible panelboard assembly 220. The spare fuse holder 300 may be mounted to the panelboard assembly 300 in a similar manner to the holder 206 (FIG. 7), although it is recognized that there are various alternative ways and positions that the fuse holder 300 could be mounted.

In the example shown, the spare fuse holder 300 is fabricated from a nonconductive material such as plastic formed into a generally rectangular body including includes slots capable of holding, for example, a 30 A CUBEFuse™ 54a, a 60 A CUBEFuse™ 54b, or a 100 A CUBEFuse™ 54c which are each respectively different sizes. The spare fuses 54a, 54b, and 54c may be retained to the spare fuse holder 300 with plug in connection and easily removed when needed. It is contemplated, however, that other retaining features are possible and could be used to secure the spare fuses 54a, 54b, and 54c from the holder. While six spare fuses are shown in FIG. 18, greater or fewer numbers of spare fuses may alternatively be accommodated.

An opened fuse may be removed from one of the fusible switching disconnect devices 50 or 110 and replaced with one of the spare fuses 54a, 54b and 54c to quickly and conveniently restore affected branch circuitry when an electrical fault condition occurs. By providing the holder 300 and the spare fuses 54a, 54b and 56b in the panel assembly itself, a technician need not search for and obtain a suitable replacement fuse and circuitry may be restored much more quickly.

Figure 20:
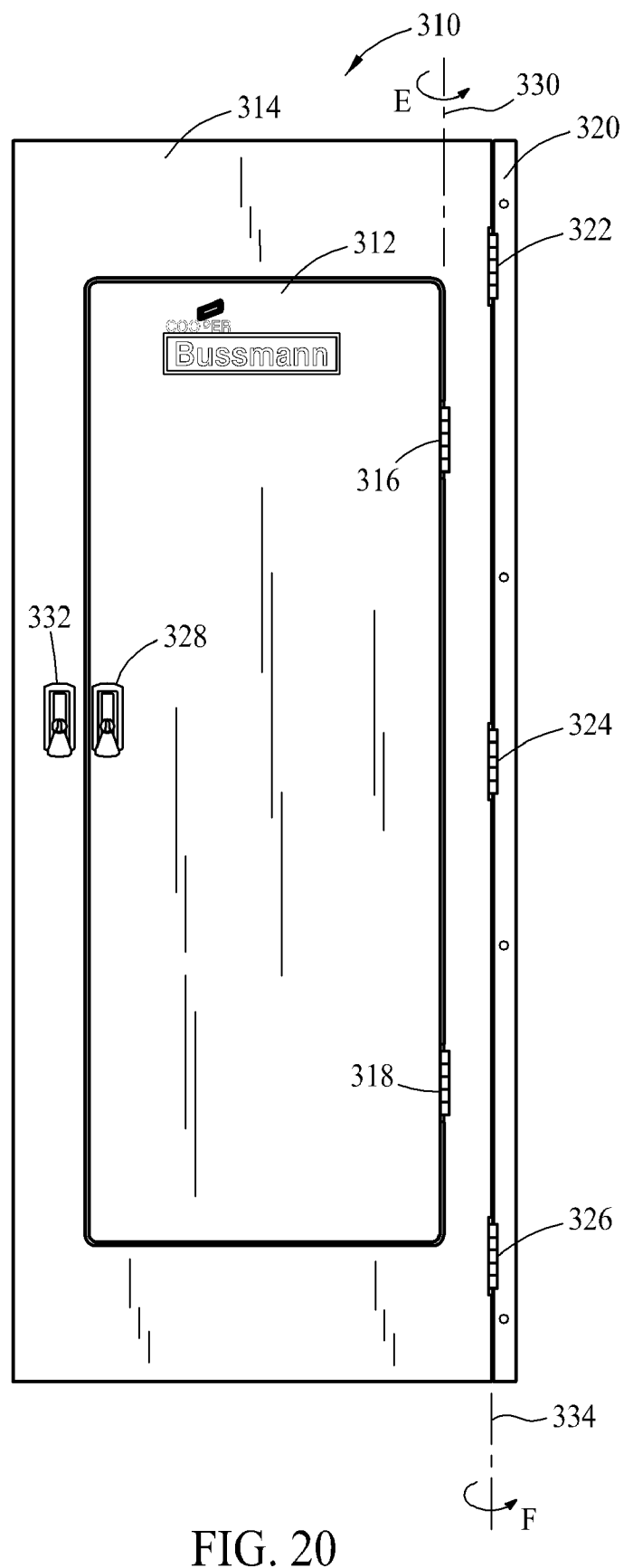
FIG. 20 is a front elevational view of an exemplary door assembly for a fusible panel assembly.

FIG. 20 illustrates still another option for the fusible deadfront panelboard assemblies described, namely a front door assembly 310 that is mountable to an enclosure such as those described above and enclosing a chassis such as those described above. The door assembly 310 as shown in FIG. 20 is sometimes referred to as door-in-door assembly and includes an inner door 312 and an outer door 314 that are independently operable from one another. In the example shown, the inner door 312 is defined within the outer periphery of the outer door 314. The inner door 312 is attached to the outer door 314 via a first set of hinges 316, 318 and the outer door 314 is attached to an enclosure 320 via a second set of hinges 322, 324 and 326.

The inner door 328 includes a first latch assembly 328 that when released permits the inner door 312 to swing open about a first axis 330 extending through the hinges 316 and 316 in the direction of arrow E. As such, the inner door 312 may be opened to expose a first area of the fusible panelboard assembly while the outer door 314 remains closed.

The outer door 314 includes a latch assembly 332 that when released permits the outer door 314 to swing open about a second axis 334 extending through the hinges 322, 324, 326 in the direction of arrow F. As such, the outer door 314 may be opened to expose a second area of the fusible panelboard assembly while the inner door 312 remains closed.

Additionally, both the inner and outer doors 312, 314 may be opened to expose the first and second areas of the fusible panelboard assembly. Thus, by virtue of the inner and outer doors 312, 314 different areas of the fusible panel assembly may be exposed without having to remove the door assembly 310 from the enclosure 320.

Table 2 is a comparison table of the panel assembly 200 relative to other types of panelboards. In Table 2, the panel assembly 200 is identified as QSCP or QSCP4 in different versions with different amperage ratings.

TABLE 2

| Panelboard Type Main Lug Only & No Load Side Option | Manufacturer | Fusible or CB | Volume 42 branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP or QSCP4 | Bussmann | Fusible | 6785.0 | 600 | 400 | 200,000 | 0.0884 | 29 |
| QSCP or QSCP4 | Bussmann | Fusible | 5750.0 | 600 | 200 | 200,000 | 0.1043 | 35 |
| EP | Bussmann | Fusible | 7728.0 | 277 | 200 | 100,000 | 0.0358 | 13 |
| PRL3A | Eaton | CB | 6900.0 | 600 | 400 | 50,000 | 0.0870 | 7 |
| PRL4B | Eaton | CB | 19955.3 | 600 | 400 | 200,000 | 0.0301 | 10 |
| PRL4F | Eaton | Fusible | 19955.3 | 600 | 400 | 200,000 | 0.0301 | 10 |
| P2 | Siemens | CB | 8510.0 | 600 | 400 | 100,000 | 0.0705 | 12 |
| NF | Square D | CB | 6440.0 | 480/277 | 400 | 65,000 | 0.0430 | 10 |
| Type AD | GE | CB | 7417.5 | 600/347 | 400 | 35,000 | 0.0468 | 5 |
| | | | | 480 | 400 | 100,000 | 0.0647 | 13 |
| Type AE | GE | CB | 7417.5 | 480/277 | 400 | 14,000 | 0.0373 | 2 |

The increase in the short circuit current rating (SCCR) per volume relative to other known panelboards is, as the reader can see, significant.

Still further improvements, and also variations in the interrupting ratings are possible with different configurations of the panel assembly 200 and with different main service disconnect device types, as demonstrated in the following Tables 3 through 13.

TABLE 3

| Panelboard Type Main Lug Only & No Load Side Option | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 18 | Fusible | 3795.0 | 600 | 200 | 200,000 | 0.1581 | 53 |
| QSCP4 | 18 | Fusible | 5750.0 | 600 | 400 | 200,000 | 0.1043 | 35 |
| QSCP4 | 30 | Fusible | 3795.0 | 600 | 200 | 200,000 | 0.1581 | 53 |
| QSCP4 | 30 | Fusible | 5750.0 | 600 | 400 | 200,000 | 0.1043 | 35 |

TABLE 4

| Panelboard Type Main Lug Only & Feed Through Lugs | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
| --- | --- | --- | --- | --- | --- | --- | --- | --- |
| QSCP4 | 18 | Fusible | 3795.0 | 600 | 200 | 200,000 | 0.1581 | 53 |
| QSCP4 | 18 | Fusible | 5750.0 | 600 | 400 | 200,000 | 0.1043 | 35 |
| QSCP4 | 30 | Fusible | 3795.0 | 600 | 200 | 200,000 | 0.1581 | 53 |
| QSCP4 | 30 | Fusible | 5750.0 | 600 | 400 | 200,000 | 0.1043 | 35 |
| QSCP4 | 42 | Fusible | 5750.0 | 600 | 200 | 200,000 | 0.1043 | 35 |
| QSCP4 | 42 | Fusible | 6785.0 | 600 | 400 | 200,000 | 0.0884 | 29 |

TABLE 5

| Panelboard Type Main Lug Only & TVSS Device | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
| --- | --- | --- | --- | --- | --- | --- | --- | --- |
| QSCP4 | 18 | Fusible | 5750.0 | 600 | 200 | 200,000 | 0.1043 | 35 |
| QSCP4 | 18 | Fusible | 5750.0 | 600 | 400 | 200,000 | 0.1043 | 35 |
| QSCP4 | 30 | Fusible | 5750.0 | 600 | 200 | 200,000 | 0.1043 | 35 |
| QSCP4 | 30 | Fusible | 6785.0 | 600 | 400 | 200,000 | 0.0884 | 29 |
| QSCP4 | 42 | Fusible | 5750.0 | 600 | 200 | 200,000 | 0.1043 | 35 |
| QSCP4 | 42 | Fusible | 6785.0 | 600 | 400 | 200,000 | 0.0884 | 29 |

TABLE 6

| Panelboard Type Main Lug Only & Load Side Disconnect Switch | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
| --- | --- | --- | --- | --- | --- | --- | --- | --- |
| QSCP4 | 18 | Fusible | 6785.0 | 600 | 400 | 200,000 | 0.0884 | 29 |
| QSCP4 | 30 | Fusible | 7935.0 | 600 | 400 | 200,000 | 0.0756 | 25 |

TABLE 7

| Panelboard Type Non Fused Disconnect & No Load Side Option | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
| --- | --- | --- | --- | --- | --- | --- | --- | --- |
| QSCP4 | 18 | Fusible | 3795.0 | 600 | 200 | 200,000 | 0.1581 | 53 |
| QSCP4 | 18 | Fusible | 5750.0 | 600 | 400 | 100,000 | 0.1043 | 17 |
| QSCP4 | 30 | Fusible | 5750.0 | 600 | 200 | 200,000 | 0.1043 | 35 |
| QSCP4 | 30 | Fusible | 6785.0 | 600 | 400 | 100,000 | 0.0884 | 15 |
| QSCP4 | 42 | Fusible | 5750.0 | 600 | 200 | 200,000 | 0.1043 | 35 |
| QSCP4 | 42 | Fusible | 6785.0 | 600 | 400 | 100,000 | 0.0884 | 15 |

TABLE 8

| Panelboard Type Non Fused Disconnect & Feed Through Lugs | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
| --- | --- | --- | --- | --- | --- | --- | --- | --- |
| QSCP4 | 18 | Fusible | 3795.0 | 600 | 200 | 200,000 | 0.1581 | 53 |
| QSCP4 | 18 | Fusible | 5750.0 | 600 | 400 | 100,000 | 0.1043 | 17 |
| QSCP4 | 30 | Fusible | 5750.0 | 600 | 200 | 200,000 | 0.1043 | 35 |
| QSCP4 | 30 | Fusible | 6785.0 | 600 | 400 | 100,000 | 0.0884 | 15 |
| QSCP4 | 42 | Fusible | 5750.0 | 600 | 200 | 200,000 | 0.1043 | 35 |
| QSCP4 | 42 | Fusible | 6785.0 | 600 | 400 | 100,000 | 0.0884 | 15 |

TABLE 9

| Panelboard Type Non Fused Disconnect & TVSS Device | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 18 | Fusible | 5750.0 | 600 | 200 | 200,000 | 0.1043 | 35 |
| QSCP4 | 18 | Fusible | 6785.0 | 600 | 400 | 100,000 | 0.0884 | 15 |
| QSCP4 | 30 | Fusible | 5750.0 | 600 | 200 | 200,000 | 0.1043 | 35 |
| QSCP4 | 30 | Fusible | 6785.0 | 600 | 400 | 100,000 | 0.0884 | 15 |
| QSCP4 | 42 | Fusible | 6785.0 | 600 | 200 | 200,000 | 0.0884 | 29 |
| QSCP4 | 42 | Fusible | 7935.0 | 600 | 400 | 100,000 | 0.0756 | 13 |

TABLE 10

| Panelboard Type Non Fused Disconnect & Load Side Disconnect Switch | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 18 | Fusible | 7935.0 | 600 | 400 | 200,000 | 0.0756 | 25 |

TABLE 11

| Panelboard Type Fused Disconnect & No Load Side Option | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 18 | Fusible | 5750.0 | 600 | 200 | 200,000 | 0.1043 | 35 |
| QSCP4 | 18 | Fusible | 6785.0 | 600 | 400 | 100,000 | 0.0884 | 15 |
| QSCP4 | 30 | Fusible | 5750.0 | 600 | 200 | 200,000 | 0.1043 | 35 |
| QSCP4 | 30 | Fusible | 6785.0 | 600 | 400 | 100,000 | 0.0884 | 15 |
| QSCP4 | 42 | Fusible | 5750.0 | 600 | 60 | 200,000 | 0.1043 | 35 |
| QSCP4 | 42 | Fusible | 6785.0 | 600 | 200 | 200,000 | 0.0884 | 29 |
| QSCP4 | 42 | Fusible | 7935.0 | 600 | 400 | 100,000 | 0.0756 | 13 |

TABLE 12

| Panelboard Type Fused Disconnect & Feed Through Lugs | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 18 | Fusible | 5750.0 | 600 | 200 | 200,000 | 0.1043 | 35 |
| QSCP4 | 18 | Fusible | 6785.0 | 600 | 400 | 100,000 | 0.0884 | 15 |
| QSCP4 | 30 | Fusible | 5750.0 | 600 | 200 | 200,000 | 0.1043 | 35 |
| QSCP4 | 30 | Fusible | 7935.0 | 600 | 400 | 100,000 | 0.0756 | 13 |
| QSCP4 | 42 | Fusible | 5750.0 | 600 | 60 | 200,000 | 0.1043 | 35 |
| QSCP4 | 42 | Fusible | 6785.0 | 600 | 200 | 200,000 | 0.0884 | 29 |
| QSCP4 | 42 | Fusible | 7935.0 | 600 | 400 | 100,000 | 0.0756 | 13 |

TABLE 13

| Panelboard Type Fused Disconnect & TVSS Device | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 18 | Fusible | 5750.0 | 600 | 200 | 200,000 | 0.1043 | 35 |
| QSCP4 | 18 | Fusible | 6785.0 | 600 | 400 | 100,000 | 0.0884 | 15 |
| QSCP4 | 30 | Fusible | 5750.0 | 600 | 60 | 200,000 | 0.1043 | 35 |
| QSCP4 | 30 | Fusible | 6785.0 | 600 | 200 | 200,000 | 0.0884 | 29 |
| QSCP4 | 30 | Fusible | 7935.0 | 600 | 400 | 100,000 | 0.0756 | 13 |

TABLE 13-continued

| Panelboard Type Fused Disconnect & TVSS Device | # Branch Circuits | Fusible or CB | Volume branch circuits (in3) | Max Voltage (V) | Max Amperage (A) | SCCR fully rated (A) | FOM1 Max Voltage/ Volume (V/in3) | FOM2 SCCR/ Volume (A/in3) |
|---|---|---|---|---|---|---|---|---|
| QSCP4 | 42 | Fusible | 6785.0 | 600 | 200 | 200,000 | 0.0884 | 29 |
| QSCP4 | 42 | Fusible | 7935.0 | 600 | 400 | 100,000 | 0.0756 | 13 |

Judging from the tables above, in practically all the configurations shown higher panel interrupting ratings, and sometimes dramatically higher ratings, are made possible compared to existing panelboards. In addition to SCCR per cubic inch ratings, marked increases can be seen in voltage per cubic inch ratings compared to conventional panelboards as shown in Table 1. While a number possible of configurations and possible ratings have been tabulated, it is recognized that still others are possible. The preceding tables are provided for purposes of illustration rather than limitation.

The benefits and advantages of the invention are now believed to be amply illustrated in connection with the exemplary embodiments disclosed.

An exemplary embodiment of a fusible panelboard assembly has been disclosed including: a chassis configured to interchangeably receive a plurality of fusible switching disconnect modules for protecting branch circuitry, wherein the plurality of fusible switching disconnect modules each include a switch housing and a rectangular fuse module removably insertable to and from the switch housing, and wherein the plurality of fusible switching disconnect modules include at least two respective fuses having different amperage ratings and corresponding differently sized switch housings.

Optionally, the fusible switching disconnect modules may include a switch actuator movable to open and close a circuit path through the respective rectangular fuse module. Each of the fusible switching disconnect modules may not involve a circuit breaker.

As another option, the panelboard assembly may further include a line side main service device having terminal elements, the chassis including barrier elements physically isolating the respective terminals of the main service device, and a cover extending between the barrier elements, the cover movable between an open position providing access to the terminals and a closed position blocking access to the terminals. An enclosure and a door may also be provided, with the door movable relative to the chassis between an open position providing access to the chassis and a closed position blocking access to the chassis, and the door being separately provided and independently operable from the cover. The cover may include a plurality of covers. The cover may be integrally provided with the barrier elements, and the cover is hinged. The door may be a deadfront door, and a removable door trim may surround the chassis.

The panelboard assembly may further optionally include a line side main service device and a load side disconnect device separate from the fusible switching disconnect modules. The chassis may include a bus bar, and the load side disconnect device may be directly connected to the bus bar. In one example, the panelboard assembly may have an amperage rating of at least 225 A, and the load side disconnect device has an amperage rating of at least 110 A. The load side disconnect device may be a switch.

A configurable branch enclosure cover may optionally be coupled to the chassis and adapted to surround the plurality of fusible switching disconnect modules. The branch enclosure cover may be configurable by a user to accommodate user selected fusible switching disconnect modules. The branch enclosure cover may have configurable openings for receiving differently sized fusible switching disconnect modules. The branch enclosure cover may include a frame and a series of first removable portions and second removable portions, each of the first and second removable portions being arranged in adjacent mutual pairs. The first removable portion may correspond in size to a first outer dimension of a first fusible switching disconnect module and when removed from the frame defines an opening accommodating the first outer dimension. The second removable portion in combination with the first removable portion corresponds in size to a second outer dimension of a second fusible switching disconnect module, whereby when both the first and second removable portions are removed from the frame an opening is defined that accommodates the second outer dimension. The first and second removable portions may be knockout portions defined by perforations.

A spare fuse holder may optionally be provided, and may be configured to store rectangular fuse modules of at least two different sizes. The spare fuse holder may be configured to store rectangular fuse modules of at least three different sizes. The different sizes may correspond to rectangular fuse modules having amperage ratings of up to 30 A, up to 60 A and up to 100 A.

In exemplary embodiments, the panelboard assembly may a voltage rating of about 600V AC and a current rating of about 400 A. The assembly may have a current interruption rating up to about 200 kA. The assembly may have a width of about 20 inches or less. The assembly may have an interrupting rating per volume of at least about 25 amps per cubic inch in one embodiment, at least about 35 amps per cubic inch in another embodiment, and at least about 53 amps per cubic inch in still another embodiment. The fusible panelboard assembly may have a voltage per cubic inch rating of at least about 0.1043 in one embodiment, and a voltage per cubic inch rating of at least about 0.1581 in another embodiment.

The panelboard assembly may optionally include a front door assembly including an inner door and outer door. The inner door and the outer door may be independently movable from one another to expose different areas of the panelboard assembly without having to remove the door assembly. The inner door may be defined within an outer periphery of the outer door. The inner door may be hinged on the outer door.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fusible panelboard assembly comprising:
a chassis configured to interchangeably receive a plurality of fusible switching disconnect modules for protecting branch circuitry,
wherein the plurality of fusible switching disconnect modules include a first fusible switching disconnect module having a first switch housing of a first size and a first rectangular fuse module having a first amperage rating or below, the first rectangular fuse module removably insertable to and from the first switch housing, and a second fusible switching disconnect module having second switch housing of a second size and a second rectangular fuse module having a second amperage rating or below, the second rectangular fuse module removably insertable to and from the second switch housing;
wherein the first size is less than the second size; and
wherein the first amperage rating is less than the second amperage rating; and
a configurable branch enclosure cover coupled to the chassis and adapted to surround the plurality of fusible switching disconnect modules;
wherein the configurable branch enclosure cover is configurable by a user to accommodate user selected fusible switching disconnect modules, the user selected fusible switching disconnect modules being ones of the plurality of fusible switching disconnect modules;
wherein the configurable branch enclosure cover is configurable to receive either one of the first and second fusible switch disconnect modules;
wherein the configurable branch enclosure cover includes a frame and at least one column of contiguous first removable portions and second removable portions, each of the first and second removable portions being arranged in adjacent mutual pairs arranged as rows in the at least one column;
wherein in each of the adjacent mutual pairs, the first removable portion corresponds in size to a first outer dimension of the first switch housing, whereby when the first removable portion is removed from the frame in the each of the adjacent mutual pairs, an opening is defined in the configurable branch enclosure cover accommodating the first outer dimension; and
wherein in the each of the adjacent mutual pairs, the second removable portion in combination with a the first removable portion corresponds in size to a second outer dimension of the second switch housing, whereby when the second removable portion and the first removable portion in the each of the adjacent mutual pairs are removed from the frame, a collective opening is defined in the configurable branch enclosure cover accommodating the second outer dimension.

2. The fusible panelboard assembly of claim 1, wherein each of the plurality of fusible switching disconnect modules include a switch actuator movable to open and close a circuit path through either the first or second rectangular fuse modules.

3. The fusible panelboard assembly of claim 1, wherein each of the plurality of fusible switching disconnect modules does not involve a circuit breaker.

4. The fusible panelboard assembly of claim 1, further comprising a line side main service device having a plurality of terminal elements, the chassis including barrier elements physically isolating respective terminal elements of the plurality of terminal elements, and at least one cover extending between the barrier elements, the at least one cover movable between an open position providing access to at least one of the plurality of terminal elements and a closed position blocking access to the at least one of the plurality of terminal elements.

5. The fusible panelboard assembly of claim 4, further comprising an enclosure and a door, the door movable relative to the chassis between an open position providing access to the chassis and a closed position blocking access to the chassis, and the door being separately provided and independently operable from the at least one cover.

6. The fusible panelboard assembly of claim 5, wherein the door is a deadfront door.

7. The fusible panelboard assembly of claim 4, wherein the at least one cover comprises a plurality of covers.

8. The fusible panelboard assembly of claim 4, wherein the at least one cover is integrally provided with at least one of the barrier elements.

9. The fusible panelboard assembly of claim 4, wherein the at least one cover is hinged.

10. The fusible panelboard assembly of claim 4, further comprising a removable door trim surrounding the chassis.

11. The fusible panelboard assembly of claim 1, further comprising a line side main service device and a load side disconnect device separate from the plurality of fusible switching disconnect modules.

12. The fusible panelboard assembly of claim 11, wherein the chassis includes a bus bar, and the load side disconnect device is directly connected to the bus bar.

13. The fusible panelboard assembly of claim 11, wherein the fusible panelboard assembly has an amperage rating of at least 225 A, and the load side disconnect device has an amperage rating of at least 110 A.

14. The fusible panelboard assembly of claim 11, wherein the load side disconnect device is a switch.

15. The fusible panelboard assembly of claim 1, wherein the first and second removable portions are knockout portions defined by perforations.

16. The fusible panelboard assembly of claim 1, further comprising a spare fuse holder, the spare fuse holder configured to store a first replacement rectangular fuse module and a second replacement rectangular fuse module, the first replacement rectangular fuse module having the first amperage rating and the second replacement fuse having the second amperage rating, the first and second replacement rectangular fuse modules being replacements for the first and second rectangular fuse modules respectively.

17. The fusible panelboard assembly of claim 16, wherein the spare fuse holder is further configured to store a third replacement rectangular fuse module, the third replacement rectangular fuse module having a third amperage rating, the third amperage rating being different from either the first amperage rating or the second amperage rating.

18. The fusible panelboard assembly of claim 1, wherein the fusible panelboard assembly has a voltage rating of about 600V AC and a current rating of about 400 A.

19. The fusible panelboard assembly of claim 1, wherein the fusible panelboard assembly has a current interruption rating up to about 200 kA.

20. The fusible panelboard assembly of claim 1, wherein the fusible panelboard assembly has a width of about 20 inches or less.

21. The fusible panelboard assembly of claim 20 wherein the fusible panelboard assembly has an interrupting rating per volume of at least about 25 amps per cubic inch.

22. The fusible panelboard assembly of claim 20, wherein the fusible panelboard assembly has an interrupting rating per volume of at least about 35 amps per cubic inch.

23. The fusible panelboard assembly of claim 20, wherein the fusible panelboard assembly has an interrupting rating per volume of at least about 53 amps per cubic inch.

24. The fusible panelboard assembly of claim 20, wherein the fusible panelboard assembly has a voltage per cubic inch rating of at least about 0.1043.

25. The fusible panelboard assembly of claim 20, wherein the fusible panelboard assembly has a voltage per cubic inch rating of at least about 0.1581.

26. The fusible panelboard assembly of claim 1, further comprising a front door assembly, the front door assembly including an inner door and an outer door.

27. The fusible panelboard assembly of claim 26, wherein the inner door and the outer door are independently movable from one another to expose different areas of the fusible panelboard assembly without having to remove the front door assembly.

28. The fusible panelboard assembly of claim 27, wherein the inner door is defined within an outer periphery of the outer door.

29. The fusible panelboard assembly of claim 28, wherein the inner door is hinged on the outer door.

* * * * *